United States Patent
Ishikawa et al.

(10) Patent No.: US 9,630,740 B2
(45) Date of Patent: Apr. 25, 2017

(54) COMESTIBLE PRODUCT DISPENSERS AND METHODS OF MAKING AND USING SAME

(75) Inventors: Yoichiro Ishikawa, Glenview, IL (US); James W. Wolff, Chicago, IL (US); Heather L. Fluegel, Chicago, IL (US)

(73) Assignee: WM. WRIGLEY JR. COMPANY, Chicago, IL (US)

(*) Notice: Subject to any disclaimer, the term of this patent is extended or adjusted under 35 U.S.C. 154(b) by 2347 days.

(21) Appl. No.: 11/609,448

(22) Filed: Dec. 12, 2006

(65) Prior Publication Data

US 2007/0141199 A1 Jun. 21, 2007

Related U.S. Application Data

(63) Continuation-in-part of application No. 11/301,964, filed on Dec. 12, 2005, now abandoned, which is a
(Continued)

(51) Int. Cl.
*A23G 4/00* (2006.01)
*B65D 5/52* (2006.01)
(Continued)

(52) U.S. Cl.
CPC .......... *B65D 5/5253* (2013.01); *B65D 5/0254* (2013.01); *B65D 5/10* (2013.01);
(Continued)

(58) Field of Classification Search
CPC ................................ B65D 85/60; B65D 85/62
(Continued)

(56) References Cited

U.S. PATENT DOCUMENTS 317,795 A 5/1885 Jaeger
901,858 A 10/1908 Williams
(Continued)

FOREIGN PATENT DOCUMENTS

BE 539 773 7/1959
DE 1118691 11/1961
(Continued)

OTHER PUBLICATIONS

International Search Report (7 pgs.).
(Continued)

*Primary Examiner* — Drew Becker
*Assistant Examiner* — Bryan Kim
(74) *Attorney, Agent, or Firm* — Armstrong Teasdale LLP

(57) ABSTRACT

The present invention provides an improved product holding and dispensing package and an improved method for manufacturing, holding, and storing products, especially comestible products. In an embodiment, a package for comestible products may be provided. The package includes a package blank having walls that define a package interior. The package also includes a sheet disposed inside the package interior. The sheet wraps around a stack of comestible products and maintains the products in a stacked formation. The sheet also retains the comestible products against lateral movement within the sheet. In an embodiment, the plurality of comestible products are releasably attached to the sheet to prevent the comestible products from sliding out of the sheet. In an embodiment, the sheet may be attached to the package interior.

4 Claims, 34 Drawing Sheets

Related U.S. Application Data continuation-in-part of application No. 10/935,044, filed on Sep. 7, 2004, now Pat. No. 7,527,189.

(60) Provisional application No. 60/560,306, filed on Apr. 6, 2004.

(51) Int. Cl.

| | | |
|---|---|---|
| *B65D 85/60* | (2006.01) | |
| *B65D 5/02* | (2006.01) | |
| *B65D 5/10* | (2006.01) | |
| *B65D 5/38* | (2006.01) | |
| *B65D 5/66* | (2006.01) | |
| *B65D 5/72* | (2006.01) | |
| *B65D 75/24* | (2006.01) | |
| *B65D 85/62* | (2006.01) | |

(52) U.S. Cl.
CPC .............. *B65D 5/38* (2013.01); *B65D 5/66* (2013.01); *B65D 5/722* (2013.01); *B65D 75/245* (2013.01); *B65D 85/60* (2013.01); *A23G 4/00* (2013.01); *B65D 85/62* (2013.01); *B65D 2313/10* (2013.01)

(58) Field of Classification Search
USPC ........ 426/115, 108, 112, 119, 3–6, 106, 121, 426/110, 122, 123, 126, 127, 392, 394, 426/396, 410, 411
See application file for complete search history.

(56) References Cited

U.S. PATENT DOCUMENTS

| | | |
|---|---|---|
| 939,252 A | 11/1909 | Hanna |
| 960,288 A | 6/1910 | Dustan |
| 1,188,199 A | 6/1916 | Paquette |
| 1,216,259 A | 2/1917 | Armstrong |
| 1,247,225 A | 11/1917 | Cloovas |
| 1,249,910 A | 12/1917 | Deginder |
| 1,275,904 A | 8/1918 | Grotta |
| 1,282,814 A | 10/1918 | Guedalia et al. |
| 1,432,932 A | 10/1922 | Weis et al. |
| 1,433,439 A | 10/1922 | Weis et al. |
| 1,485,716 A | 3/1924 | Rogers |
| 1,538,106 A | 5/1925 | Gaylord et al. |
| 1,707,853 A | 4/1929 | Haberman et al. |
| 1,735,323 A | 11/1929 | L'Enfant |
| D83,042 S | 1/1931 | Goldberg |
| 1,822,512 A | 9/1931 | Tanner et al. |
| 1,832,604 A | 11/1931 | Wupper et al. |
| 1,855,382 A | 4/1932 | Burroughs |
| 1,871,426 A | 8/1932 | Schmitt et al. |
| 2,008,168 A | 4/1933 | Bergstein |
| 1,936,186 A | 11/1933 | Burger |
| 2,117,281 A | 8/1935 | Bravi |
| 2,140,748 A | 1/1936 | Johanson |
| 2,035,246 A | 3/1936 | Rea |
| 2,048,617 A | 7/1936 | O'Brien |
| 2,192,472 A | 10/1936 | Huston |
| 2,192,473 A | 10/1936 | Huston |
| 2,059,382 A | 11/1936 | Maten et al. |
| 2,063,556 A | 12/1936 | O'Brien |
| 2,197,219 A | 4/1938 | Groshong |
| 2,210,194 A | 10/1938 | Baldwin |
| 2,210,195 A | 11/1938 | Baldwin |
| 2,210,196 A | 11/1938 | Baldwin |
| 2,149,445 A | 3/1939 | Kreiten |
| 2,263,191 A | 9/1939 | Saladin et al. |
| 2,216,476 A | 10/1940 | Mutz |
| 2,255,450 A | 9/1941 | Mutchler |
| 2,277,097 A | 3/1942 | Hansen |
| 2,282,036 A | 5/1942 | Cobbs et al. |
| 2,284,171 A | 5/1942 | Silberman |
| 2,319,560 A | 5/1943 | Salfisberg et al. |
| 2,333,943 A | 11/1943 | Levkoff et al. |
| 2,380,367 A * | 7/1945 | Ranney ............................ 426/5 |
| 2,410,486 A | 11/1946 | Evans |
| 2,465,841 A | 3/1949 | Bonini et al. |
| 2,533,255 A | 12/1950 | Will |
| 2,554,021 A | 5/1951 | Irving |
| 2,619,226 A | 11/1952 | Adams et al. |
| 2,627,972 A | 2/1953 | Roos |
| 2,669,349 A | 2/1954 | Silver |
| 2,762,553 A | 9/1956 | Bentz et al. |
| 2,789,752 A | 4/1957 | Will |
| 2,826,296 A | 3/1958 | Mullinix et al. |
| 2,877,927 A | 3/1959 | King, Jr. |
| 2,975,953 A | 3/1961 | Muth |
| 3,035,756 A | 5/1962 | Mullinix et al. |
| 3,040,929 A | 6/1962 | Tapper |
| 3,059,762 A | 10/1962 | Yoshimoto |
| 3,092,501 A | 6/1963 | Beck et al. |
| 3,137,435 A | 6/1964 | Meyers |
| 3,153,504 A | 10/1964 | Mischel et al. |
| 3,159,308 A | 12/1964 | Passavanti |
| 3,166,216 A | 1/1965 | Guarr |
| 3,186,542 A | 6/1965 | Greene |
| 3,201,258 A * | 8/1965 | Mastella ............................ 426/5 |
| 3,301,437 A | 1/1967 | Faber |
| 3,344,951 A | 10/1967 | Gervais |
| 3,365,099 A | 1/1968 | McTaggart |
| 3,370,775 A | 2/1968 | Link |
| 3,410,455 A | 11/1968 | Haas |
| 3,426,814 A | 2/1969 | Bundy |
| 3,459,297 A | 8/1969 | Templeton et al. |
| 3,489,272 A | 1/1970 | Rosen |
| 3,524,580 A | 8/1970 | Heyworth et al. |
| 3,565,284 A | 2/1971 | Hinterreiter |
| 3,583,625 A | 6/1971 | Gero |
| 3,591,043 A | 7/1971 | Murphy |
| 3,593,908 A | 7/1971 | Desmond et al. |
| 3,612,348 A | 10/1971 | Thomas |
| 3,612,349 A | 10/1971 | Thomas |
| 3,664,572 A | 5/1972 | Puchkoff et al. |
| 3,749,234 A | 7/1973 | Gero |
| 3,777,961 A | 12/1973 | Blaschek |
| 3,807,601 A | 4/1974 | Frankenberg |
| 3,827,624 A | 8/1974 | Dogliotti |
| 3,845,882 A | 11/1974 | Hass |
| 4,098,430 A | 7/1978 | Mattheis et al. |
| 4,109,826 A | 8/1978 | Maisonneuve |
| D250,171 S | 11/1978 | Yoshimoto |
| D250,748 S | 1/1979 | Leger |
| 4,133,449 A | 1/1979 | Ostrowsky |
| 4,142,566 A | 3/1979 | Stolp |
| 4,168,786 A | 9/1979 | Veiniere |
| 4,171,753 A | 10/1979 | Vreede |
| 4,172,520 A | 10/1979 | Gero |
| 4,202,445 A | 5/1980 | Porter |
| 4,230,237 A | 10/1980 | de Wit |
| 4,232,816 A | 11/1980 | Johnson et al. |
| 4,280,651 A | 7/1981 | Montealegre et al. |
| 4,281,788 A | 8/1981 | Aeba |
| 4,282,990 A | 8/1981 | Miyashita |
| 4,354,619 A | 10/1982 | Wippermann et al. |
| D270,028 S | 8/1983 | Vernin |
| 4,418,838 A | 12/1983 | Gallina |
| 4,465,208 A | 8/1984 | Buban et al. |
| 4,492,316 A | 1/1985 | Emms |
| 4,518,092 A | 5/1985 | Contreras, Sr. |
| 4,530,445 A | 7/1985 | Decker |
| 4,570,797 A | 2/1986 | Weinman |
| 4,588,081 A | 5/1986 | Newsome et al. |
| 4,589,573 A | 5/1986 | Tada |
| 4,703,853 A | 11/1987 | Byrns |
| 4,724,984 A | 2/1988 | Wilken et al. |
| D298,515 S | 11/1988 | Pennell |
| 4,863,034 A | 9/1989 | Contreras, Sr. |
| 4,989,747 A | 2/1991 | Demurger |
| D315,638 S | 3/1991 | Pennell |
| 5,011,010 A | 4/1991 | Francis et al. |
| 5,014,906 A | 5/1991 | Gero |
| 5,029,712 A | 7/1991 | O'Brien et al. |

(56) References Cited

U.S. PATENT DOCUMENTS

| | | |
|---|---|---|
| 5,048,720 A | 9/1991 | Hoke |
| 5,071,033 A | 12/1991 | Siwek |
| 5,080,258 A | 1/1992 | Hinterreiter |
| 5,089,309 A | 2/1992 | Odate et al. |
| 5,118,034 A | 6/1992 | Tsao |
| 5,125,211 A | 6/1992 | O'Brien et al. |
| 5,169,018 A | 12/1992 | Fiore |
| 5,174,492 A | 12/1992 | Gero |
| 5,204,130 A | 4/1993 | McDevitt et al. |
| D343,095 S | 1/1994 | Wass |
| 5,275,291 A | 1/1994 | Sledge |
| D343,768 S | 2/1994 | Cautereels et al. |
| 5,344,039 A | 9/1994 | Taniyama |
| 5,351,858 A | 10/1994 | Bar-Yona et al. |
| 5,353,956 A | 10/1994 | Wilson |
| D353,744 S | 12/1994 | Ferris et al. |
| 5,370,219 A | 12/1994 | Violett, Jr. |
| 5,405,007 A | 4/1995 | Iwahashi |
| 5,405,047 A | 4/1995 | Hansen |
| 5,460,295 A | 10/1995 | Law |
| 5,489,060 A | 2/1996 | Godard |
| 5,505,328 A | 4/1996 | Stribiak |
| D375,457 S | 11/1996 | King et al. |
| 5,630,508 A | 5/1997 | Petit |
| 5,632,378 A | 5/1997 | Provost |
| 5,712,009 A | 1/1998 | Moore et al. |
| 5,752,615 A | 5/1998 | Hofmann et al. |
| 5,785,206 A | 7/1998 | Chan |
| 5,797,494 A | 8/1998 | Balling et al. |
| 5,816,441 A | 10/1998 | Farside |
| D406,057 S | 2/1999 | Hager |
| D406,496 S | 3/1999 | Medina |
| 5,885,630 A * | 3/1999 | Zurawski et al. ............. 426/5 |
| D412,279 S | 7/1999 | Brice |
| 5,931,302 A | 8/1999 | Isaacs et al. |
| 5,954,228 A | 9/1999 | Minnette |
| 6,068,126 A | 5/2000 | DeJonge |
| D430,489 S | 9/2000 | Bowers et al. |
| D434,652 S | 12/2000 | Mori |
| 6,189,779 B1 | 2/2001 | Verdicchio et al. |
| 6,220,480 B1 | 4/2001 | Stankus et al. |
| 6,230,931 B1 | 5/2001 | Mandle et al. |
| 6,273,294 B1 | 8/2001 | Petzold et al. |
| D447,686 S | 9/2001 | Cattell et al. |
| D449,782 S | 10/2001 | Diaz |
| D454,303 S | 3/2002 | Sipinen |
| D458,127 S | 6/2002 | de Groote |
| 6,401,970 B1 | 6/2002 | Harris et al. |
| 6,425,495 B1 | 7/2002 | Senda et al. |
| D463,975 S | 10/2002 | Sipinen |
| D471,804 S | 3/2003 | Staples |
| D472,772 S | 4/2003 | Noble et al. |
| 6,543,639 B1 | 4/2003 | Kovens |
| D475,917 S | 6/2003 | Grant |
| D479,464 S | 9/2003 | Kopecky |
| D480,561 S | 10/2003 | Simon et al. |
| D484,046 S | 12/2003 | Kopecky |
| D485,490 S | 1/2004 | Grant |
| D485,750 S | 1/2004 | Grant |
| D485,751 S | 1/2004 | Grant |
| 6,676,013 B2 | 1/2004 | Auclair |
| 6,708,826 B1 | 3/2004 | Ginsberg et al. |
| 6,709,684 B2 | 3/2004 | Loth |
| 6,889,827 B2 | 5/2005 | Stringfield |
| 7,032,754 B2 | 4/2006 | Kopecky |
| 2002/0014437 A1 | 2/2002 | Harrison |
| 2002/0063079 A1 | 5/2002 | Loth |
| 2002/0066690 A1 | 6/2002 | Mattis et al. |
| 2002/0175180 A1 | 11/2002 | Evans et al. |
| 2003/0038043 A1 | 2/2003 | Painsith |
| 2003/0080020 A1 | 5/2003 | Kopecky |
| 2003/0234260 A1 | 12/2003 | Giraud |
| 2004/0004083 A1 | 1/2004 | Grant |
| 2005/0218201 A1 | 10/2005 | Billig et al. |
| 2005/0255199 A1 * | 11/2005 | Aldridge ................ 426/108 |
| 2005/0269233 A1 | 12/2005 | Aldridge et al. |

FOREIGN PATENT DOCUMENTS

| | | |
|---|---|---|
| DE | 100 46 179 | 5/2001 |
| FR | 1344873 | 12/1962 |
| FR | 1368875 | 8/1964 |
| FR | 2780950 | 1/2000 |
| JP | 7-329957 | 12/1995 |
| JP | 11-001220 | 1/1999 |
| JP | 11-001221 | 1/1999 |
| JP | 2003-267355 | 9/2003 |
| WO | 95 13228 | 5/1995 |
| WO | 03/003774 | 5/2003 |
| WO | 2005/100172 | 10/2005 |
| WO | 2005/110042 | 11/2005 |
| WO | 2006/028960 | 3/2006 |

OTHER PUBLICATIONS

Written Opinion of the International Searching Authority (6 pgs.).
Communication of a Notice of Opposition in European Patent No. 2163489, dated Jul. 2, 2013.

* cited by examiner

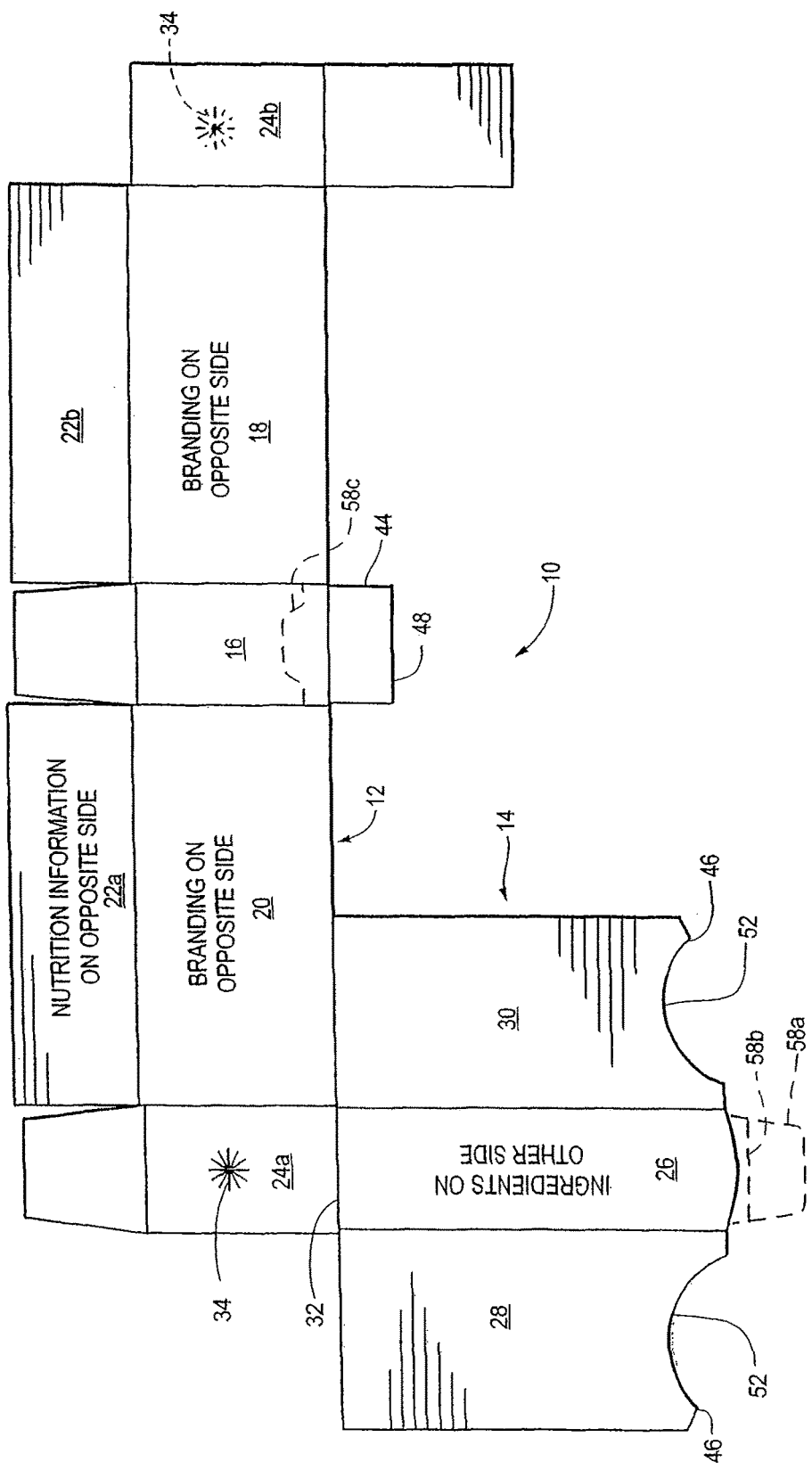

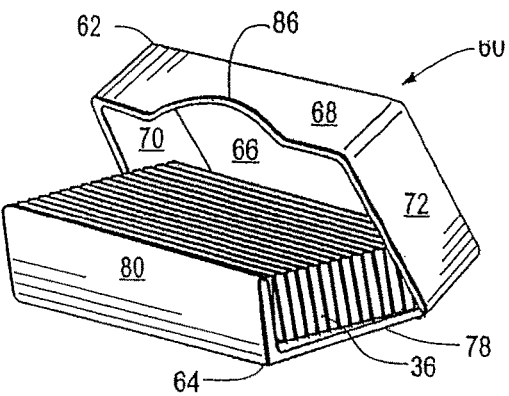
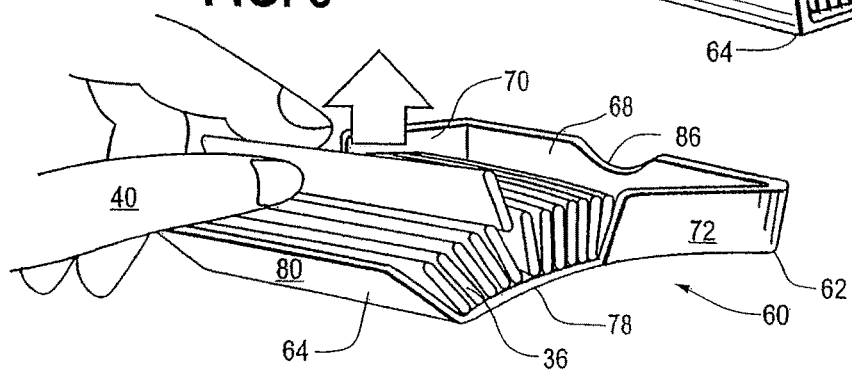
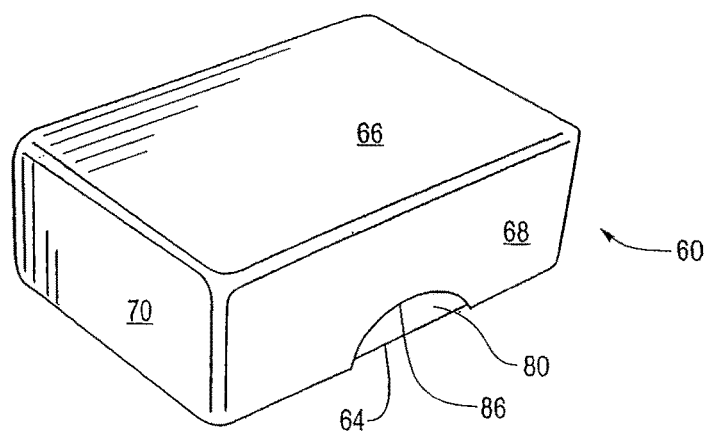
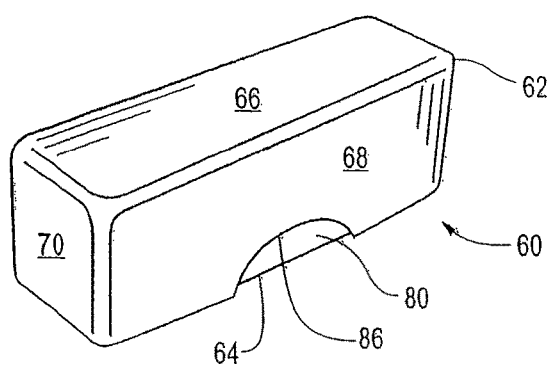

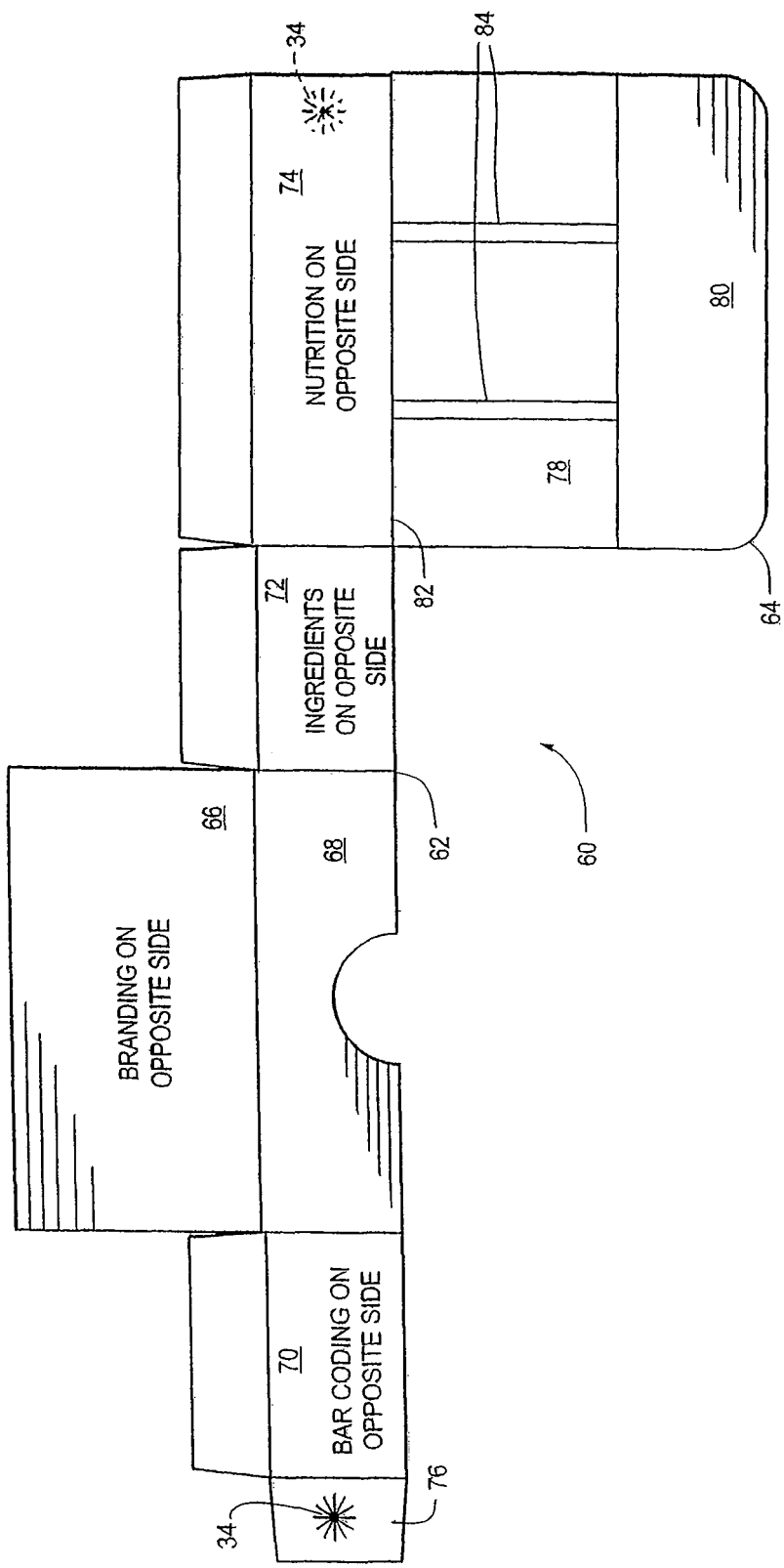

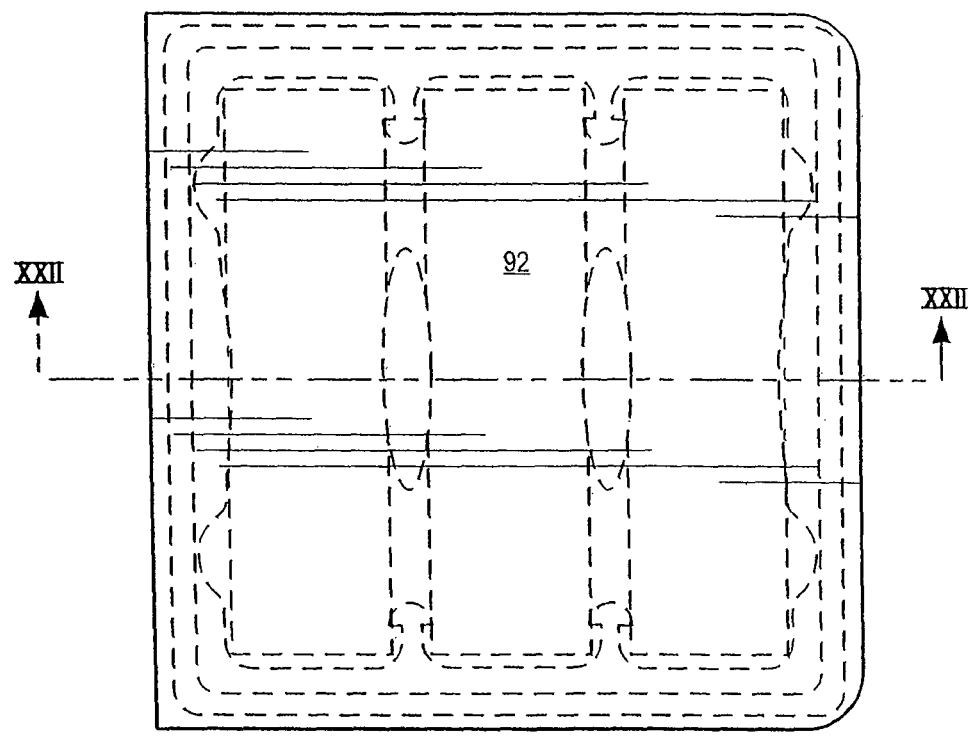
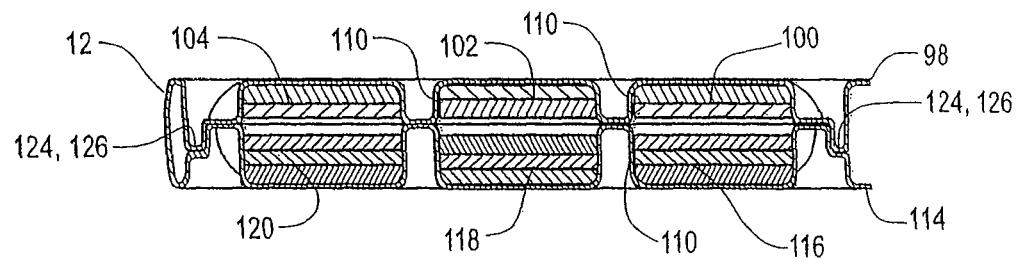

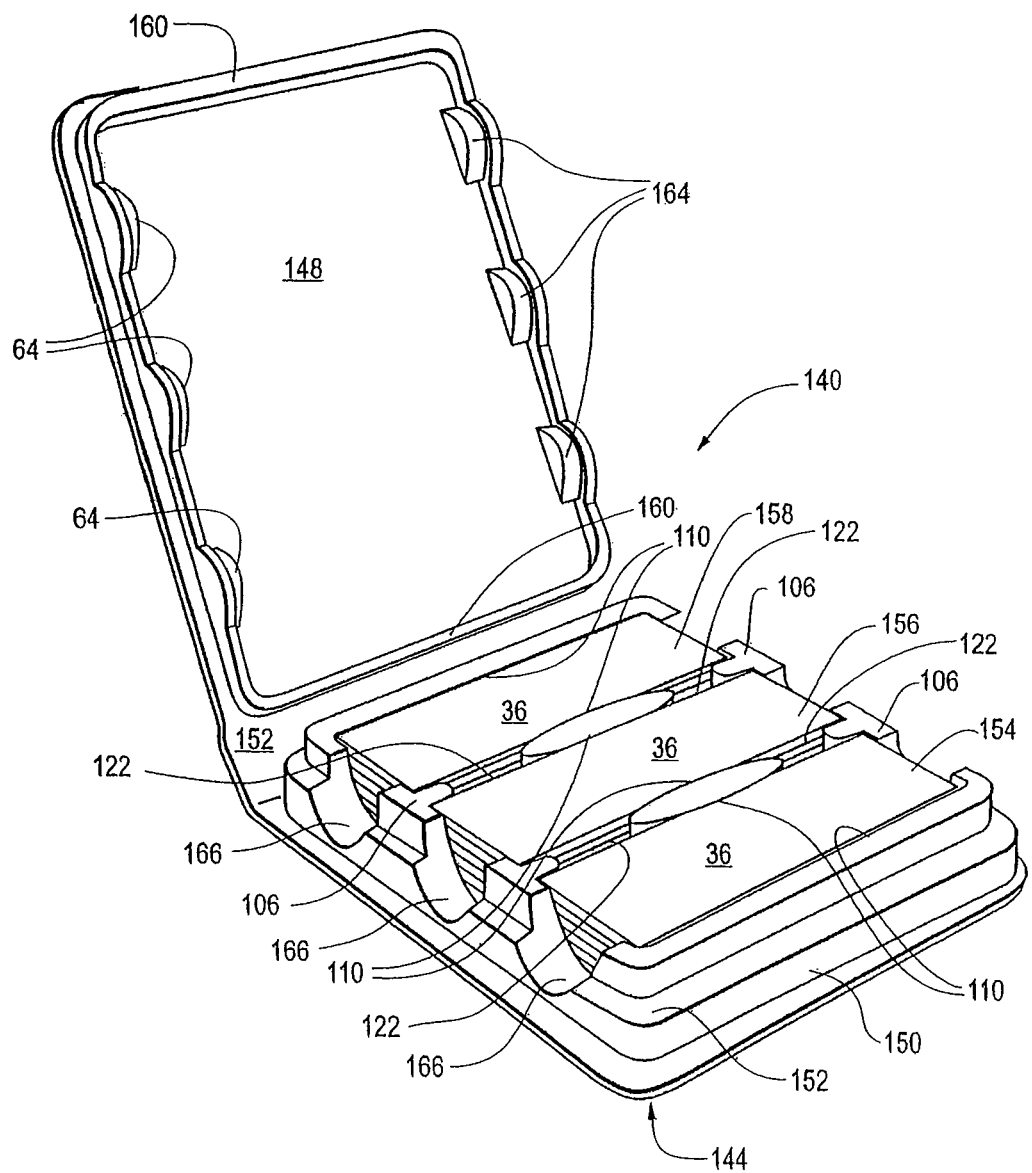

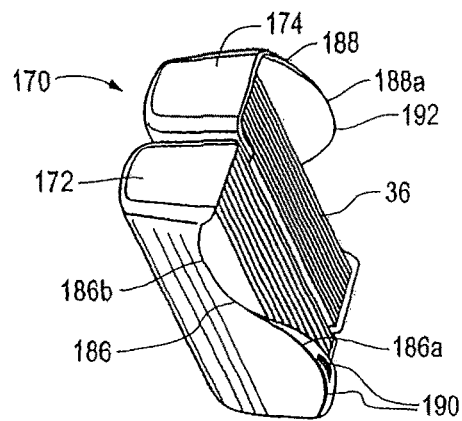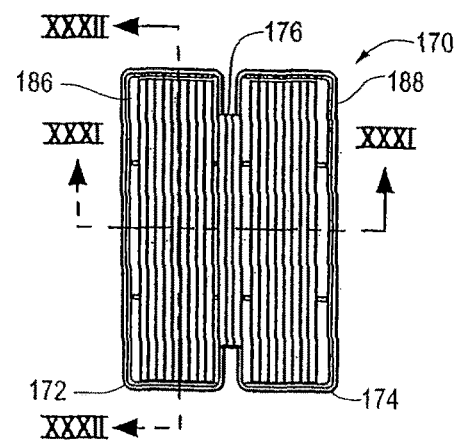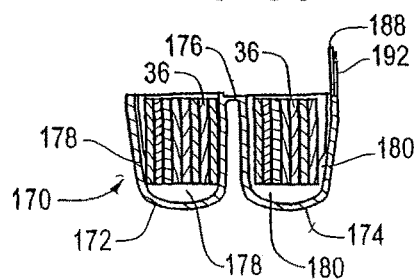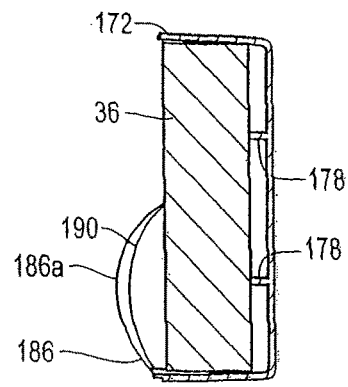

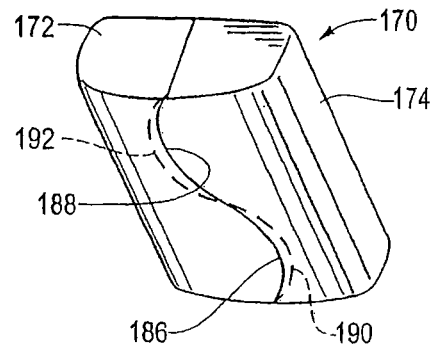
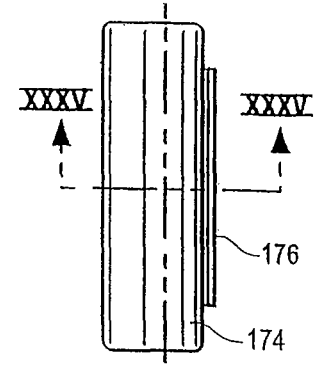
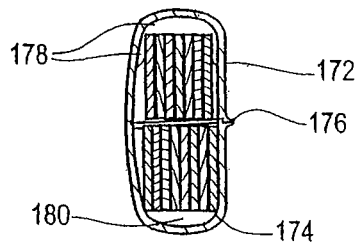
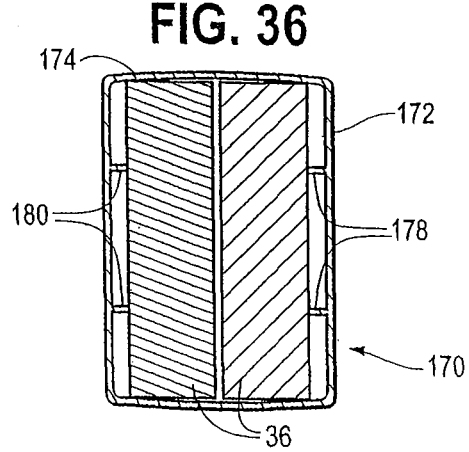
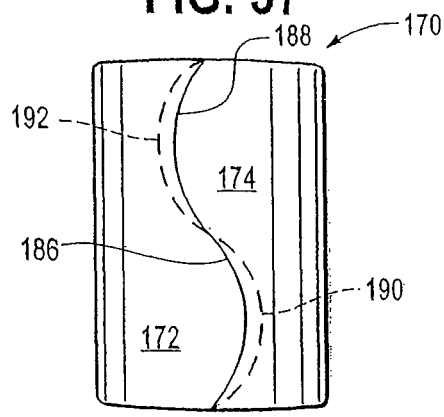

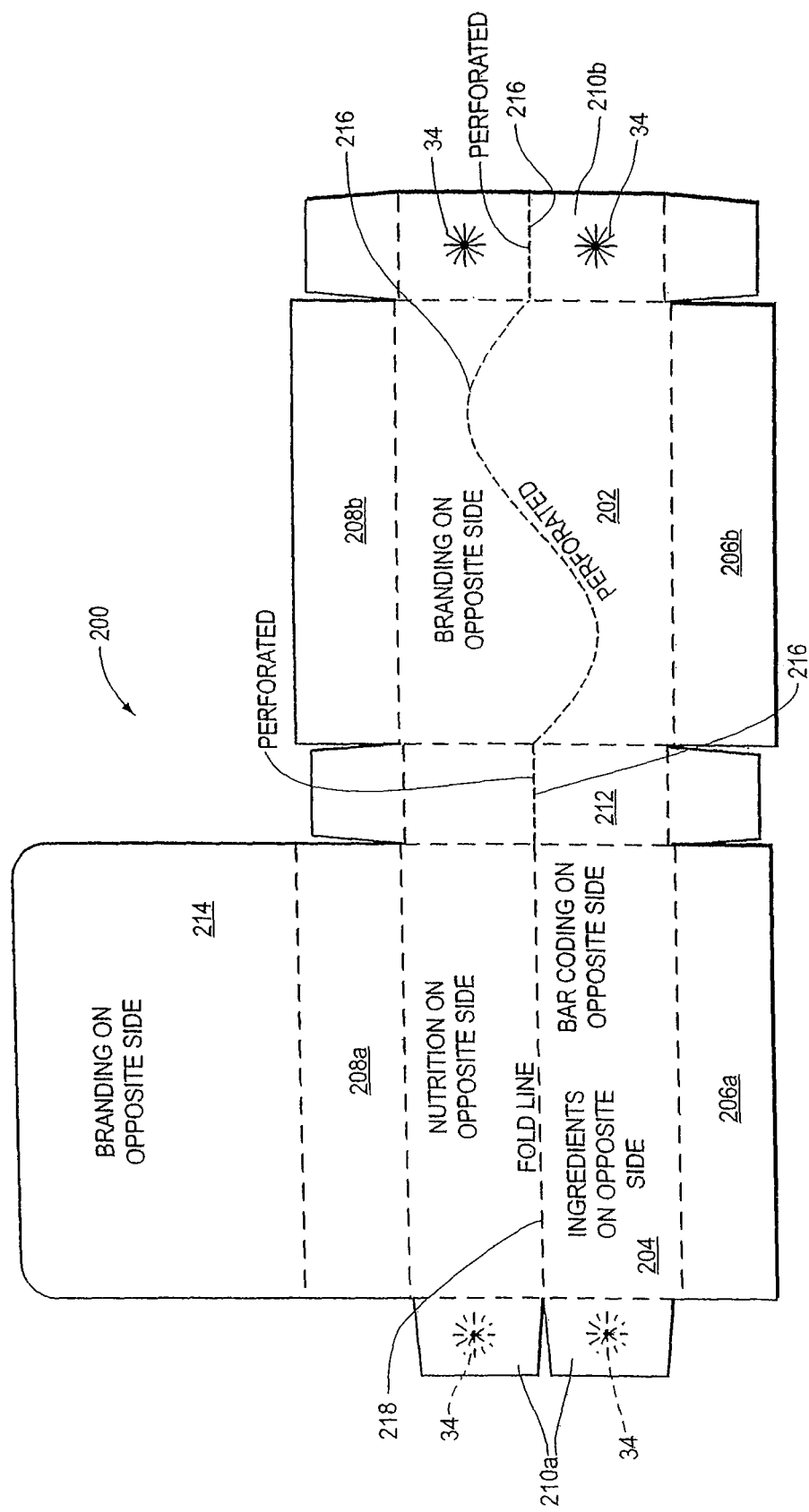

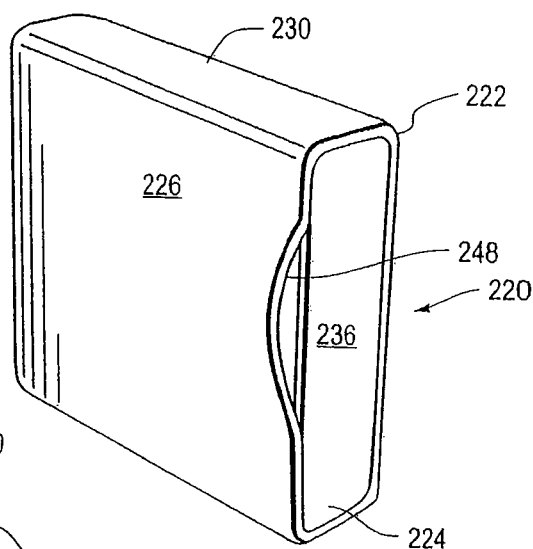
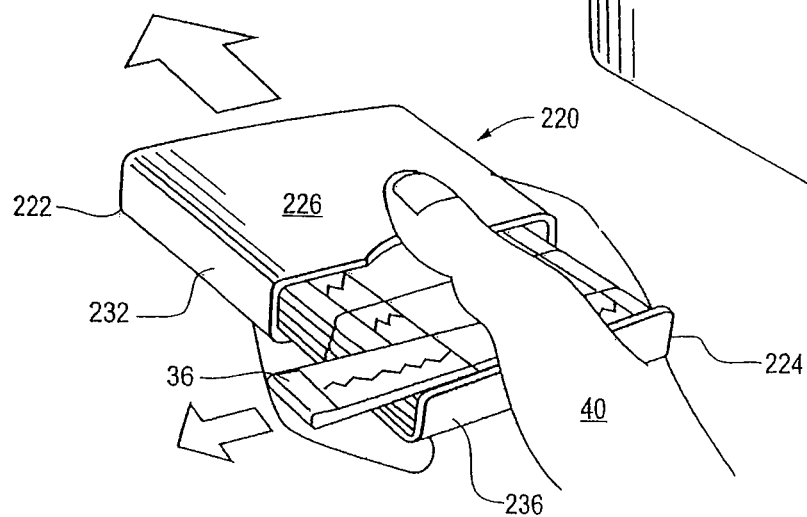
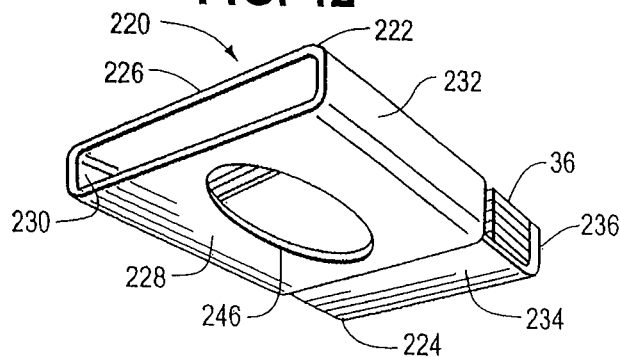
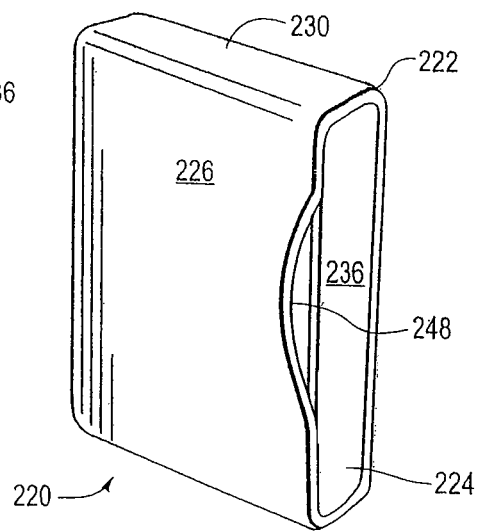

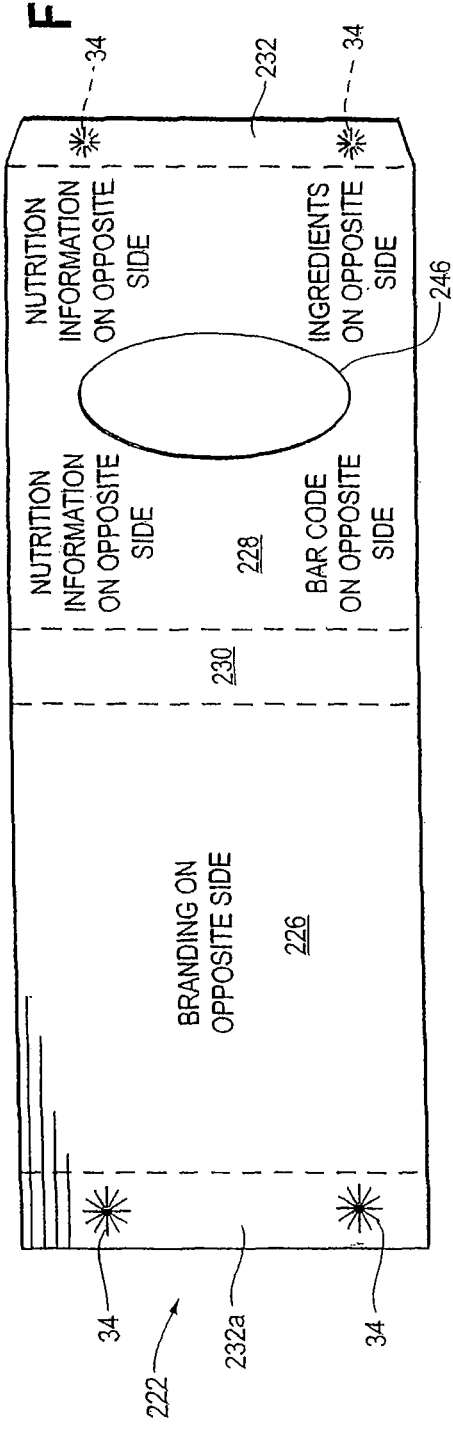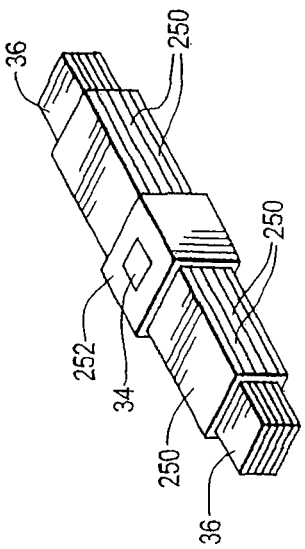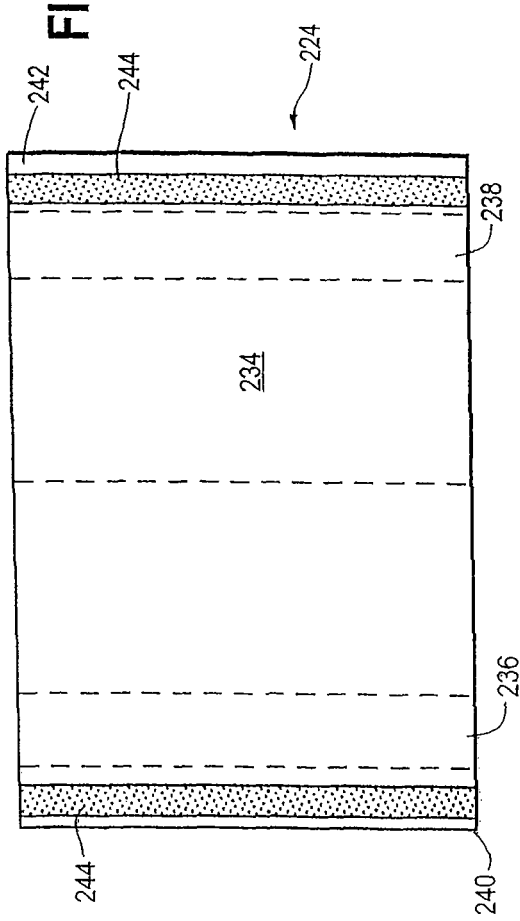

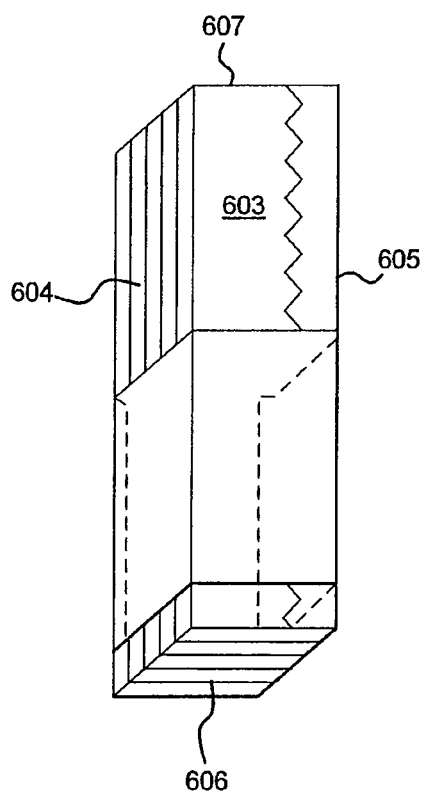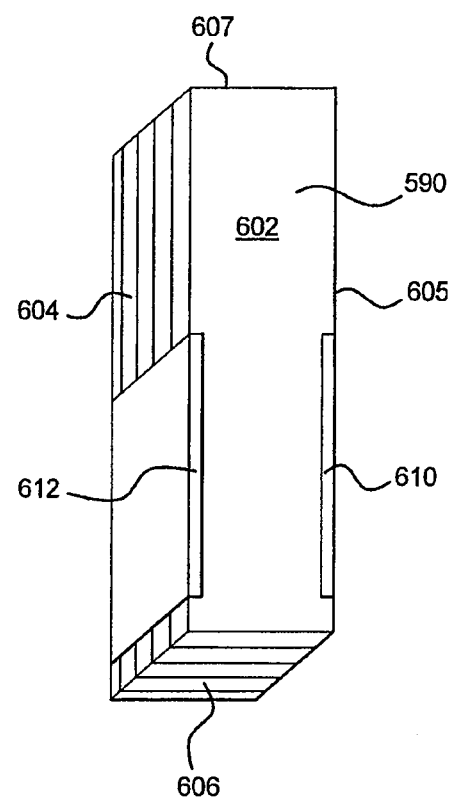

FIG. 61C
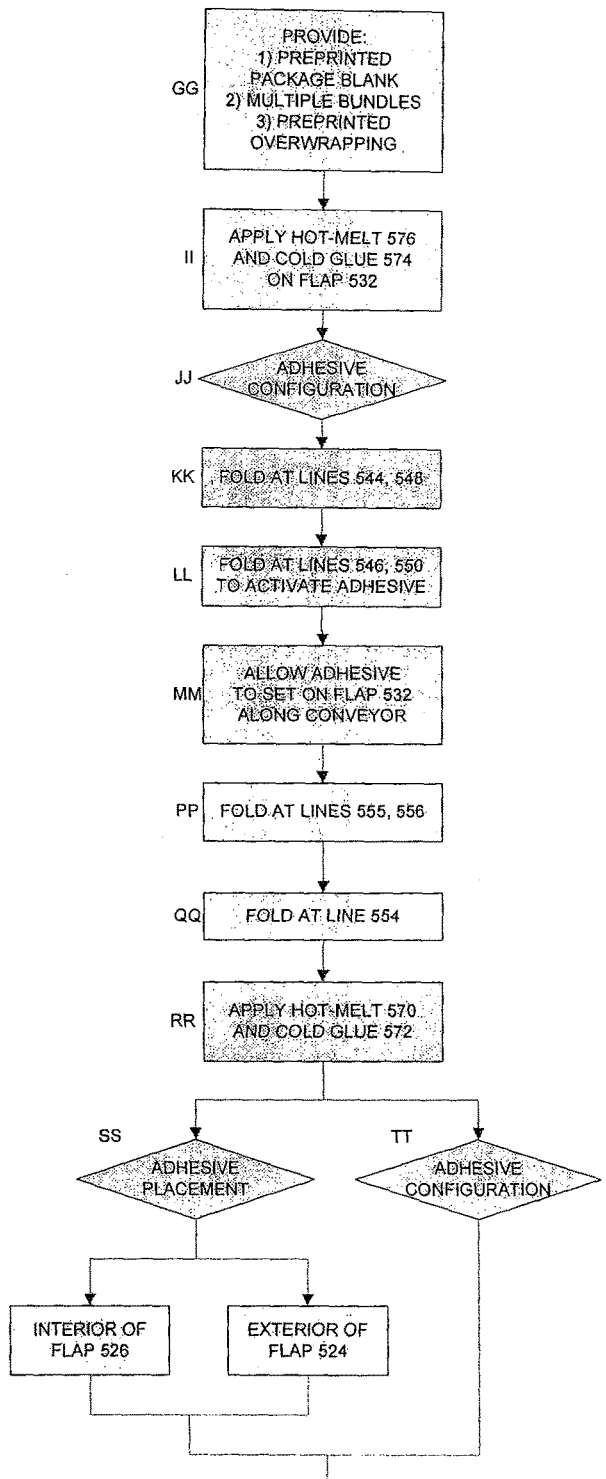
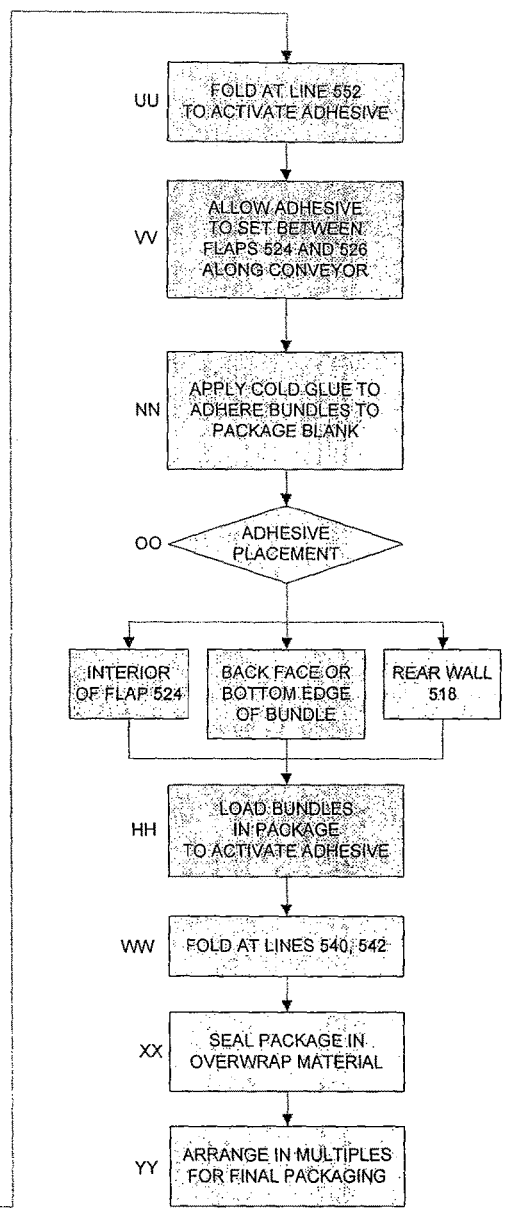

COMESTIBLE PRODUCT DISPENSERS AND METHODS OF MAKING AND USING SAME

CLAIM OF PRIORITY

This application is a continuation-in-part of U.S. patent application Ser. No. 11/301,964 entitled "Comestible Product Dispensers and Methods of Making and Using Same", filed on Dec. 12, 2005, which is a continuation-in-part of U.S. patent application Ser. No. 10/935,044 and entitled the same, filed on Sep. 7, 2004 which claims priority from U.S. Provisional Application No. 60/560,306 filed Apr. 6, 2004, all of which are incorporated herein by reference.

BACKGROUND

The present invention relates generally to packaging. More particularly, the present invention relates to packaging for storing and dispensing comestible products.

The packaging for comestible products is very important to the look, marketing and storage of the product. Very often, in addition to text on the packaging, the packaging also attempts to visually convey a message about the type of product, the taste of the product or the purpose of the product. For example, packages for cinnamon or cherry tasting products are often red, packages for grape tasting products are often purple, etc. Once the consumer has identified a desired brand, the consumer can typically choose a product based solely on the color of the packaging.

In marketing the product, packaging can convey other information besides taste whereby the consumer can thereby associate the product with its effect by simply viewing the packaging.

There are also practical facets to packaging comestible products, namely, keeping the products from being damaged during shipping, keeping the products fresh, and in certain instances providing a reusable package. Some comestible products do not require that the packaging be robust, sturdy or reusable.

Other comestible products are packaged in pieces and may or may not be provided in a reusable package, as desired by the manufacturer. If it is felt that only a portion of the products may be consumed in one sitting, the manufacturer may wish to provide a box having a hingedly connected lid.

With certain comestible products, the consumer tears open a package and removes a product or piece of the product. One problem with this type of packaging is that the remaining product tends to fall out of the package after the consumer removes a number of pieces from the package. Another problem with these packages is that it becomes difficult, especially with a newly opened package, to remove a piece without ripping open a significant portion of the package.

Attempting to provide a package that holds the product even after the removal of multiple pieces can make removing the comestible product more difficult. Tightly packing the product may aid in holding the product at the expense of gaining access to the product.

It is therefore desirable to provide a comestible product package that maintains the organization of the products even after a number of the products have been removed from the package.

It is also desirable to provide comestible products in a package, wherein the products are readily accessible and removable.

Furthermore, it is desirable for a comestible product package to be flexible so that it may be sized to hold different desired amounts of product.

SUMMARY

The present invention provides an improved product package and an improved method for manufacturing, holding, dispensing and storing products, especially comestible products. A package for comestible products may house a plurality of comestible products in stack that is at least one product wide and at least two products deep without sacrificing accessibility. A sheet may wrap around the stack and maintain the products in the stacked formation. The sheet may be disposed in the package to retain the comestible products against lateral movement within the package interior. The sheet may also keep the products upright inside the package even after some products have been removed from the package.

The packages or dispensers are made of, e.g., paper, paperboard, plastic, or combinations thereof as desired. The packages or dispensers disclosed herein are generally wider and thinner than known comestible product packages, making the packages or dispensers of the present invention more user friendly and more easily stored, for example, in a consumer's pants or shirt pockets.

The products stored in the packages disclosed herein are more freely exposed than in known comestible product packages, so that the consumer can grab products from multiple different areas of the package. Even so, the embodiments described below are generally able to hold the products firmly in place so that the consumer can handle and transport the package without fear of dropping or losing products.

Certain embodiments described herein include packages that are resealable or recloseable. In one embodiment, the packages are made of plastic and snap fit or press fit together in a closed position after use. When closed, the plastic packages tend to prevent ambient air from entering the packages. Other dispensers are provided that are made of paper or paperboard, which are recloseable, robust and tend not to degrade over multiple uses.

The packages described herein are also flexible and capable of being configured to house different quantities of comestible sticks, so that a line of products can be consistent between, for example, a five-stick pack and a fifteen-stick pack of comestible products.

The dispensers described herein include or provide ample space for the display of branding and product information. Moreover, each embodiment may include an outer wrapping or other type of tamper evident device so that a consumer can view readily whether or not someone has tampered with the package or the products stored therein.

In an embodiment of the present invention, a confectionery product package may be provided that includes an opaque package defining a package interior. An insertable sheet may be disposed inside the housing. The sheet may wrap a plurality of confectionery products. The plurality of confectionery products may be arranged in a stack at least one product wide and at least two products deep. The package may include at least two wrapped stacks.

In an embodiment, at least two of the confectionery products may be releasably attached to the sheet by an adhesive.

In an embodiment, the confectionery products may be releasably attached to the sheet by a friction fit.

In an embodiment, the confectionery product further includes an individual wrapper.

In an embodiment, the sheet may expose at least a portion of the stack.

In an embodiment, an adhesive may be located between portions of the sheet and the interior of the package.

In an embodiment, the sheet may be concealed within the interior of the package when the package is in an open position.

In a further embodiment, the present invention provides a method for packaging confectionery products. The method includes providing an opaque package blank. The method also includes arranging a plurality of confectionery products in a stack that is at least one product wide and at least two products deep. The stack may be wrapped in a sheet. The method also includes folding the package blank around at least two wrapped stacks to form a package.

In an embodiment, at least two wrapped stacks may be attached to the interior of the package via an adhesive.

In an embodiment, the plurality of confectionery products may be releasably attached to the sheet by applying an adhesive to one of the confectionery products and the sheet.

In an embodiment, the plurality of confectionery products may be releasably attached to the sheet using one of a wax and a cold-type adhesive.

In an embodiment, the sheet retains the confectionery products against lateral movement.

In an embodiment, the confectionery products are chewing gum.

In a further embodiment, the present invention provides another method for packaging comestible products. The method includes providing a package blank, a sheet, and a plurality of comestible products. The method also includes arranging the plurality of comestible products in a stack. Adhesive may be applied to one of the sheet and the stack. The method also includes the step of folding the sheet around the stack to adhesively close an end of the sheet and to releasably attach the plurality of comestible products to the sheet at the same time to form a wrapped stack. The wrapped stack can be attached to an interior of the package blank.

In an embodiment, the stack is at least one product wide and at least two products deep.

In an embodiment, at least two wrapped stacks may be attached to the interior of the package blank.

In an embodiment, the sheet is folded to leave at least a portion of the stack exposed.

In an embodiment, the wrapped stack is adhered to the interior of the package blank.

In an embodiment, the method further includes the step of folding the package blank to form an assembled package blank before the step of attaching the wrapped stack to an interior of the package blank.

In an embodiment, the method further includes the step of folding the package blank around the wrapped stack to form a package after the step of attaching the wrapped stack to an interior of the package blank.

In another embodiment a comestible product dispenser is provided that includes (i) a multi-sided housing with an open side, the open side bounded by multiple edges; (ii) a product compartment hingedly attached to one of the edges; and (iii) wherein the compartment includes a catch and at least one of the sides includes a stop, the stop located to abut the catch when the compartment is rotated about the hinge to a desired product dispensing location.

In an embodiment, the compartment is sized to hold a stack or stacks of comestible product sticks.

In an embodiment, the dispenser is folded together from a single piece.

In an embodiment, the dispenser is made of a material selected from the group consisting of: paper, paperboard, plastic, a polymer and any combination thereof.

In an embodiment, the compartment includes a front wall that is substantially the shape of the open side.

In an embodiment, the compartment includes at least one side wall connected to the front wall, at least one of the front wall and the side wall defining an opening that aids a consumer in removing products from the compartment.

In an embodiment, the compartment and the housing employ a tongue and slot arrangement to aid in holding the compartment in a closed position with respect to the housing when desired.

In another embodiment, the slot arrangement is multi-segmented.

In an embodiment, the tongue and slot arrangement includes notches to prevent tearing of the tongue.

In an embodiment, the compartment in a closed position is disposed inside the housing.

In an embodiment, the dispenser includes an outer wrapper and a tear strip.

In another embodiment, a comestible product dispenser is provided that includes (i) a top portion including a top wall and side walls; (ii) a base portion hingedly attached to the top portion; and (iii) a plurality of comestible products releasably attached along a side of the products to the base portion so that when the top portion is rotated away from the base multiple sides of at least some of the products are exposed.

In an embodiment, the products are attached in a row to the base.

In an embodiment, the products are each wrapped individually in a wrapping.

In an embodiment, the products are adhered to the base.

In an embodiment, the adhesion is caused using hot glue, cold glue or both.

In an embodiment, the base includes at least one glue strip and the products are adhered to the glue strip.

In an embodiment, the dispenser is folded together from a single piece.

In an embodiment, the comestible products are releasably attached to the base portion so that when the top portion is rotated away from the base three sides of at least some of the products are exposed.

In an embodiment, the dispenser includes an outer wrapper and a tear strip.

In a further embodiment, a comestible product dispenser is provided that includes (i) a top portion including a top wall and side walls; (ii) a bottom portion hingedly attached to the top portion; and (iii) wherein the top portion and the bottom portion include mating press-fitted sides that hold the top portion and the bottom portion together when it is desired, at least one of the top portion and the bottom portion including press-fitting structures spaced apart so that at least one comestible product can be press-fitted by the structures.

In an embodiment, each of the top and bottom portions includes the press-fitting structures, the structures cooperating to form a pair.

In an embodiment, at least one of the top and bottom portions includes multiple press-fitting structures spaced apart so that at least one comestible product can be press-fitted in multiple locations on the portion.

In an embodiment, each of the top and bottom portions includes press-fitting structures, the structures sized to collectively hold a desired amount of the products.

In an embodiment, the press-fitting structures of the top portion are sized to hold a different quantity of products than are the press-fitting structures of the bottom portion.

In an embodiment, only one of the top and bottom portions includes the press-fitting structures.

In an embodiment, at least one of the top portion and bottom portions includes access apertures that aid a consumer in removing one of the products press-fitted therein.

In an embodiment, at least one of the top portion and bottom portions includes access apertures in multiple orientations that aid a consumer in removing one of the products press-fitted therein.

In an embodiment, the top and bottom portions include mating press-fitting perimeters enabling the portions to be press-fitted together completely around the products.

In yet another embodiment, a comestible product dispenser is provided that includes (a) a first portion connected hingedly to a second portion; and (b) wherein the first and second portions are mated on a shared front side along a profile that varies to (i) hold comestible products within each of the portions and (ii) provide a consumer access to the products.

In an embodiment, the profile is a sinusoidal profile.

In an embodiment, the dispenser is made of a material selected from the group consisting of: paper, paperboard, plastic, a polymer and any combination thereof.

In an embodiment, the dispenser includes a flap hingedly attached to one of the first and second portions, the flap covering the shared front side to help prevent products from being removed inadvertently from the portions.

In an embodiment, the first portion holds a different number products than the second portion.

In an embodiment, the products are adhesively secured in at least one of the first and second portions.

In an embodiment, the profile includes snap-fitting apparatus that releasably mates the portions when the portions are closed.

In an embodiment, the profile is perforated initially, and wherein the consumer breaks the perforations to gain access to the products.

In an embodiment, the profile is perforated along multiple walls of each of the first and second portions.

In yet a further embodiment, a comestible product dispenser is provided that includes (i) a tray holding at least three stacks of comestible products; and (ii) a sleeve slidingly engaging the tray, the sleeve open on two ends and defining an aperture sized so that a consumer can reach through the aperture of the sleeve to the tray and move the tray relative to the sleeve to extend at least one middle stack past one of the open ends of the sleeve.

In an embodiment, the dispenser is made of a material selected from the group consisting of: paper, paperboard, plastic, a polymer and any combination thereof.

In an embodiment, the stacks include individual wrappers holding the products, the wrappers banded together so that the product is removed from the wrapper while the wrapper remains banded.

In an embodiment, a band banding the wrappers is adhered to the tray.

In an embodiment, the stacks include individual wrappers holding the products, the wrappers adhered together so that the product is removed from the wrapper while the wrappers remain adhered together.

In an embodiment, the dispenser includes an outer wrapper and a tear strip.

In a further embodiment of the present invention, the dispenser or package includes a front wall having a slot, a rear wall, a bottom wall, and opposing sidewalls. The walls define a package interior and the rear wall includes a movable flap extending therefrom. The flap includes a protruding portion adapted to engage the slot on the front wall and enclose the package interior. The package may include a debossed area and an embossed area adjacent to and surrounding the slot on the front wall. The package may also include notches adjacent to the slot and or the flap.

In another embodiment, the present invention provides a method for packaging a comestible product. The method includes providing a substrate having a plurality of integral panels and folding the panels to form a package having a front wall with a slot, a rear wall having a moveable flap, the flap having a protruding member, a bottom wall and opposing side walls to define a package interior. The method further includes engaging the protruding member with the slot to enclose the package interior. The protruding member may be disengaged from the slot in order to open the package and remove product from the container interior.

It is therefore an advantage of the present invention to house a plurality of comestible products in a package without sacrificing accessibility to the products.

It is an advantage of the present invention to provide a package for comestible products that securely holds the comestible products inside the package.

It is another advantage of the present invention to provide a package for comestible products that keeps the products organized inside the package.

It is also an advantage of the present invention to provide improved comestible product packages or dispensers.

It is another advantage of the present invention to provide comestible product packages or dispensers that more readily expose the products therein to consumers for removal.

It is yet another advantage of the present invention to provide improved methods for dispensing comestible products.

It is still a further advantage of the present invention to provide improved methods for manufacturing comestible product dispensers and apparatuses.

Furthermore, it is an advantage of the present invention to provide packages or dispensers for comestible products that better withstand multiple uses.

It is a further advantage of the present invention to provide comestible product packages or dispensers that are resealable or recloseable.

It is yet another advantage of the present invention to provide packages or dispensers that are easily opened.

It is another advantage of the present invention to provide comestible product packages or dispensers that are tear-resistant upon opening and closing the package or dispenser.

Moreover, it is an advantage of the present invention to provide packages or dispensers for comestible products that can be made of a variety of different materials.

Further, it is an advantage of the present invention to provide comestible product packages or dispensers that are flexible to be sized to hold varying amounts of products.

Additional features and advantages are described herein, and will be apparent from, the following Detailed Description and the figures.

BRIEF DESCRIPTION OF THE FIGURES

FIGS. 1 to 6 illustrate multiple different views of one embodiment of a comestible product dispenser and package of the present invention.

FIGS. 7 to 11 illustrate multiple different views of another embodiment of the comestible product package and dispenser of the present invention.

FIGS. 12 to 22 illustrate multiple views of a further embodiment of the comestible product package and dispenser of the present invention, wherein FIG. 20 is a section view taken along line XX-XX of FIG. 19, and FIG. 22 is a section view of FIG. 21 taken along line XXII-XXII of FIG. 21.

FIGS. 23 and 24 illustrate still a further different embodiment of the comestible product dispenser and package of the present invention.

FIGS. 25 to 37 illustrate multiple views of yet another embodiment of the package and dispenser of the present invention, wherein FIG. 31 is a section view taken along line XXXI-XXXI of FIG. 30, FIG. 32 is a section view taken along the line XXXII-XXXII of FIG. 30, FIG. 35 is a section view taken along lines XXXV-XXXV of FIG. 34 and FIG. 36 is a sectioned view taken along lines XXXVI-XXXVI of FIG. 34.

FIGS. 38 and 39 illustrate multiple views of yet a further embodiment of the package and dispenser of the present invention.

FIGS. 40 to 46 illustrate different views of still another embodiment of the package and dispenser of the present invention.

FIGS. 58a and 58b are perspective views of the back and front of the comestible product bundles of another embodiment.

FIGS. 61b and 61c are similar to FIG. 61a but for different embodiments.

DETAILED DESCRIPTION

The present invention includes multiple embodiments for a comestible product package and dispenser. In the embodiments described, the comestible products are illustrated as sticks of products, such as flat, rectangular pieces of comestible product. Alternatively, the products discussed herein can have any suitable types of shapes, such as a block shape, a pillow shape, a round shape, an oval shape, a rectangular shape, a triangular shape and any combination of same.

As discussed below, certain embodiments are illustrated as being made of a paper, cardboard or paperboard material, while other embodiments are disclosed as being made of a plastic material. The present invention expressly includes any of the embodiments being made of any of the materials disclosed herein, as well as any suitable paper, foil, plastic, composite or other type of material. Furthermore, while the packages and dispensers discussed herein are sized to be transported readily by a person, for example in a person's pocket, purse, backpack or the like, the embodiments described are expressly not limited to any particular size and shape.

Figure 1:
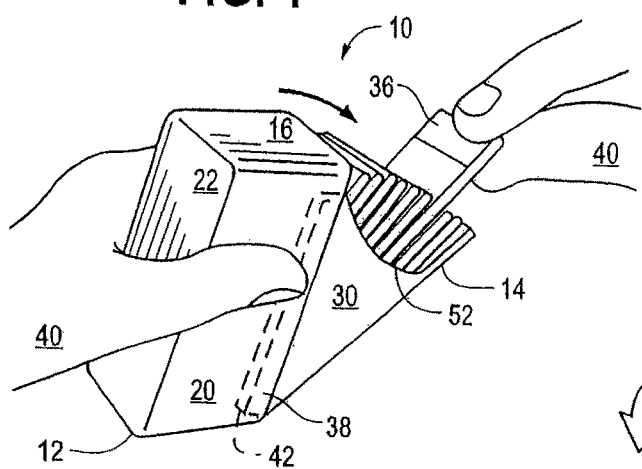
Figure 2:
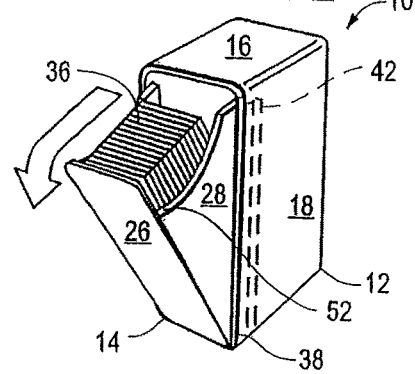
Figure 3:
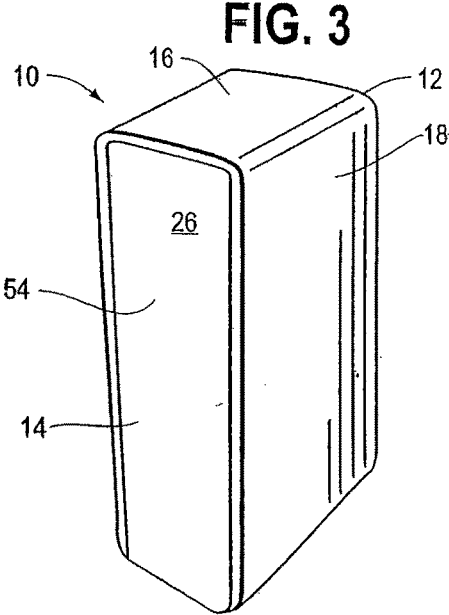
Figure 4:
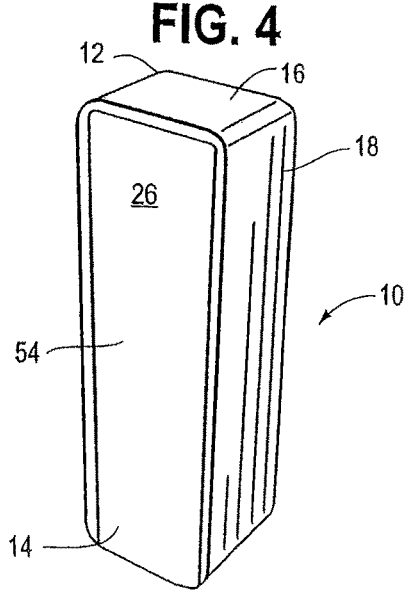
Figure 5:
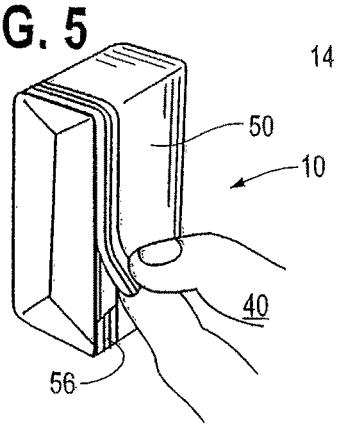

Referring now to the drawings and in particular to FIGS. 1 to 6, one embodiment of a comestible product package or dispenser is illustrated by dispenser 10. Dispenser 10 includes two main sections, namely, a housing 12 and a compartment 14 connected to housing 12. FIGS. 1 and 2 show compartment 14 in an open position. FIGS. 3 to 5 illustrate compartment 14 in a closed position with respect to housing 12.

Housing 12 in the illustrated embodiment is generally a five-sided structure having a top wall 16, sidewalls 18 and 20, a back wall 22 (referring collectively to back wall portions 22a and 22b) and a bottom wall 24 (referring collectively to bottom wall portions 24a and 24b). Hinged compartment 14 includes a front wall 26 and sidewalls 28 and 30.

Front wall 26 of compartment 14 and top wall 16 of housing 12 include cooperating apparatus in one embodiment to help hold compartment 14 in a closed position when desired. Optional apparatus 58a and 58c shown in phantom in FIG. 6 provides one example. A tongue 58a extends from front wall 26 and folds over top wall 16 along fold line 58b. Tongue 58a is inserted into slot 58c defined by top wall 16, creating a friction fit. Alternatively, the tongue extends from top wall 16 and front wall 26 defines the slot. Further alternatively, tongue 58a and top wall 16 are configured to releasably adhere to one another.

FIG. 6 illustrates package or dispenser 10 in the flat. FIG. 6 shows one embodiment where compartment 14 is formed integrally with housing 12. Compartment 14 is attached hingedly to housing 12 at hingeline 32. In an alternative embodiment, compartment 14 is formed as a piece separate from housing 12 and is glued or otherwise attached to housing 12 at bottom portion 24a.

In the illustrated embodiment, the single-piece package or dispenser 10 is glued or otherwise mated together at bottom portions 24a and 24b via adhesive or glue 34. Glue or adhesive 34 shown in solid on bottom portion 24a is received on the side of portion 24a facing out of the page in FIG. 6. Glue spot 34 shown in phantom line on bottom portion 24b is placed on the underside of that portion. Portion 24a is folded under and glued to the underside of portion 24b to form bottom wall 24. That convention is used throughout this specification. Similarly, although not illustrated, back portions 22a and 22b are glued or otherwise fixedly mated together to form back wall 22.

FIGS. 1 and 2 illustrate that when a consumer 40 shakes dispenser 10, compartment 14 falls hingedly out of housing 12 until housing 12 catches compartment 14 at a desired angular position with respect to housing 12. When consumer 40 shakes dispenser 10, compartment 14 opens to expose comestible products or comestible sticks 36. The consumer 40 may hold dispenser 10 with one hand and then remove an amount or stick of comestible product 36 with the other hand. Products 36 can be wrapped in foil or other barrier material, or exposed, as is the case with each embodiment described herein.

FIGS. 2 and 6 illustrate different embodiments for catching compartment 14 at a desired open angle with respect to housing 12. FIG. 2 illustrates that sidewalls 18 and 20 in one embodiment each define or include a folded-over or adhered lip 38, shown in phantom line in FIGS. 1 and 2. Lips 38 of sidewalls 18 and 20 catch flanged edges 42 formed integrally with or attached to sidewalls 28 and 30 of compartment 14. That is, when consumer 40 shakes dispenser 10 forward, compartment 14 hingedly falls out of housing 12 until flanged edges 42 of compartment 14 hit or abut lips or catches 38 of housing 12. That abutment stops housing 14 at the desired open angle with respect to housing 12, exposing multiple comestible products 36 one or more of which can then be removed for consumption.

FIG. 6 illustrates an alternative embodiment for catching compartment 14 at the desired open angle. FIG. 6 illustrates a lip 44, which is folded underneath top wall 16 when package 10 is assembled. Lip 44 or other similar catching element can be tacked or glued to top 16 if needed. As further seen in FIG. 6, compartment 14 is provided with catches 46 that are shaped and located on sidewalls 28 and 30 of compartment 14 to catch the rearward-facing folded edge 48 of lip 44 when compartment 14 reaches the desired open position.

The embodiment for stopping compartment 14 shown in FIG. 6 requires less material and assembly than does the embodiment illustrated in connection with FIGS. 1 and 2. The embodiment in FIG. 2, however, provides catches 38 along two sides of housing 12 and may therefore provide for a more robust package 10. The stopping compartment 14 may employ both catches 38 on sidewalls 28 and 30 and flanged edges 42, as well as lip 44 and catch 46.

Sidewalls 28 and 30 are provided with or define cutouts 52 that aid consumer 40 in readily removing any one or more exposed comestible product 36 from compartment 14 and package 10. As illustrated in FIGS. 3, 4 and 6, dispenser 10 includes or defines multiple different types of indicia, such as suitable branding, ingredient information, nutritional information, barcoding or other product identifiers and the like. As seen in FIGS. 3 and 4, certain of the indicia, such as indicia 54, can be raised or embossed. Each of the embodiments described herein can include such indicia.

FIGS. 3 and 4 illustrate that package or dispenser 10 can be provided in different sizes. Package or dispenser 10 in FIG. 3 is sized in one embodiment to hold fifteen pieces of a comestible product. Package 10 in FIG. 4 is sized in one embodiment to hold five pieces of a comestible product. A product line employing package 10 can thereby include the same look for differently sized packages and different product quantities and amounts.

Although the pieces of comestible product are shown as being dispensed laying in a plane substantially parallel to that of the bottom wall 24, the pieces of comestible product may alternatively be disposed laying in a plane substantially perpendicular to bottom wall 24.

FIG. 5 illustrates that package or dispenser 10 in one embodiment is covered or sealed initially with a wrapper 50, such as a clear cellophane wrapper. In the embodiment illustrated in FIG. 5, a tear strip 56 is provided so that consumer 40 can remove cellophane wrapper 50 without difficulty. Wrapper 50 and tear strip 56 provide evidence of tampering with package 10 and/or products 36 Tear strip 56 can be provided in different locations on wrapper 50 and is not limited to the position shown in FIG. 5.

Referring now to FIGS. 7 to 11, a second embodiment of the package or dispenser of the present invention is illustrated by package or dispenser 60. Dispenser 60 includes a top portion 62 and a bottom portion 64, which is connected hingedly to top portion 62. Top portion 62 includes a top wall 66, a front wall 68, sidewalls 70 and 72, and a back wall 74 (FIG. 11). FIG. 11 illustrates dispenser or package 60 in the flat and shows that package or dispenser 60 is generally held together by adhesive 34 placed on the topside of the back wall 74 as seen from the point of view in FIG. 11 and on the bottom side of a flap 76 connected foldably to sidewall 70.

Bottom portion 64 includes a bottom wall 78 and a front wall 80. The walls of top portion 62 and bottom portion 64 are bent as illustrated in FIGS. 7 to 10 so that when top 62 is opened or closed along hingeline 82 (seen best in FIG. 11), comestible product 36 is exposed or covered, respectively.

As seen in FIG. 11, a pair of glue strips 84 or other suitable glue pattern is placed on or defined by the top of bottom wall 78. Each comestible product 36 is releasably secured or adhered on one side of the product to glue strips 84 as seen in FIGS. 7 and 8. Products 36, as seen in FIG. 8, have or include an outside wrapper, such as a foil wrapper, in one embodiment. When consumer 40 moves top portion 62 hingedly away from bottom portion 64, comestible sticks 36 are exposed to consumer 40 in a fan-like or array-like manner as seen in FIGS. 7 and 8. The fan-like configuration is formed as comestible sticks 36 each have a fixed end and a free end, wherein the fixed ends tend to be more tightly packed than the free ends. In this regard, the bottom wall 78 may be flexible to allow arching of the bottom wall, to facilitate or enhance the fan-like presentation of the comestible pieces adhered (either directly or indirectly) to the bottom wall 78.

The glue used as glue strips 84 holds sticks 36 firmly in place. The glue is preferably not strong enough, however, to tear the foil wrapper of sticks 36. Alternatively, the sticks 36 may each be provided with a wrapper, and the wrappers each glued to the bottom wall 38 in a manner which allows the consumer to take the stick 36 out of its respective wrapper, with the wrapper remaining adhered to the bottom wall 78.

In one embodiment, one of the glue strips 84 is a hot-melt or hot-tack type strip, while the other strip 84 is a cold pressed glue strip. The hot-tack strip 84 is advantageous for manufacturing purposes because comestible sticks 36 or their wrappings can be placed on and adhered to the hot glue without mechanical pressing and potential deformation of sticks 36. When the hot glue or hot-tack cools, sticks 36 are held firmly in place. It has been found that mentholated comestible products are not compatible over time with the hot glue or hot melt adhesion. It is believed that the menthol migrates into the hot glue, tending to dissolve it. Over time, the dissolved or damaged hot glue attachment deteriorates, causing comestible sticks 36 to come loose undesirably from strips 84 and bottom wall 78.

Cold strip 84 requires that sticks 36 be mechanically pressed onto that strip. The cold glue, however, does not appear to have the same problem with mentholated products as seen with hot glue. The combination of hot and cold glue strips enables the comestible sticks 36 to be temporarily adhered to bottom wall 78 during the manufacturing process so that sticks 36 are held in a proper position for cold pressing. The cold strip thereafter secures the comestible sticks 36 over the duration of time needed to consume the products.

Package or dispenser 60 includes a number of alternatives not illustrated in FIGS. 7 to 11. First, dispenser 60 can have any suitable desirable number of glue strips 84, using any combination or arrangement of hot and cold glue, which are positioned and oriented in any desirable fashion on bottom 78 or perhaps even on the underside of top wall 66. In another alternative embodiment, one or more glue strips 84 is placed on a separate piece of paper, paperboard, or other suitable substrate. Comestible sticks 36 are adhered to the separate substrate. That subassembly is then hot tacked and/or cold pressed to bottom wall 78 of bottom portion 64 of dispenser 60.

As seen in FIGS. 9 to 11, package 60 includes suitable indicia such as branding indicia, barcoding, ingredient information, and nutrition information, for example. Front wall 68 of top portion 62 defines or includes a cutout 86 to aid consumer 40 in hingedly opening top portion 62 from bottom portion 64. Dispenser 60 in one embodiment is wrapped ultimately with a suitable wrapping, such as a cellophane wrapping. The wrapping operates with a tear strip as discussed above in connection with dispenser 10.

FIGS. 7 to 9 illustrate a larger or fifteen stick version of dispenser 60. FIG. 10 illustrates a smaller or five pack version of dispenser 60. As with dispenser 10, a product line employing package 60 can thereby include the same look for differently sized packages and different product quantities and amounts.

Packages 10 and 60 both expose consumer 40 to multiple pieces of product at one time and enable the consumer to select any or more of the exposed products. The pieces may all be essentially the same, or a variety of different pieces (e.g., different flavors, sizes, textures, types, styles, etc.) may be provided. The packaging of the present invention allows the consumer access to the piece(s) of his or her choice, regardless of its position in the package. The packages are both recloseable after each use and may be provided with frictional devices, adhesive or other means to maintain the packaging 10 and/or 60 in its closed position until intentionally opened and can be made of any of the materials discussed above. As indicated by FIGS. 6 and 11 showing dispensers 10 and 60 in the flat, respectively, packages 10 and 60 are made in one piece from paper, paperboard or cardboard in one embodiment. Alternatively, the packaging 10 and/or 60 may be made of plastic or the like.

Referring now to FIGS. 12 to 22, a further alternative embodiment of the comestible product package and dispenser of the present invention is illustrated by package or dispenser 90. Package or dispenser 90 includes or defines a lid 92 that is connected hingedly to a base 94. Dispenser 90 in one embodiment is made primarily of a plastic or polymer injection mold or thermoform. The inner structure of lid 92 and base 94 can thereby be made as a single hinged piece (see below including product holders 98 and 114 connected by hinge 112). The outer structure of lid 92 and base 94 is an outer wall or shell 96 attached to the single injection molded piece.

Figure 18:
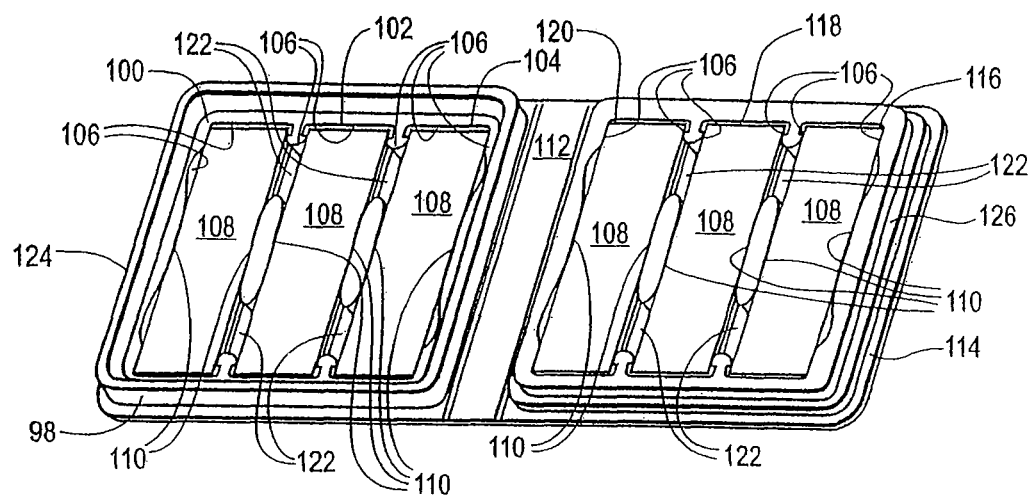
Figure 19:
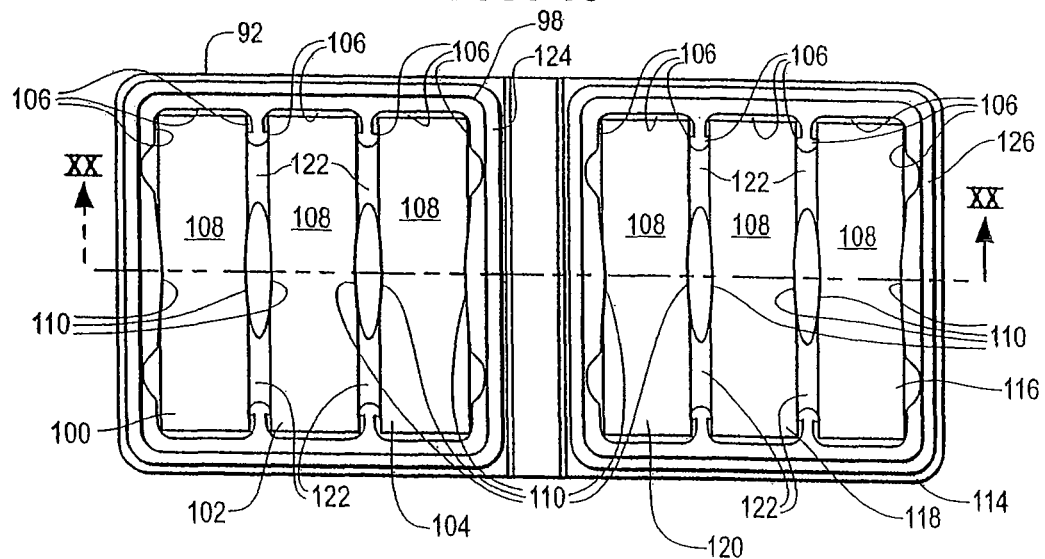
Figure 20:
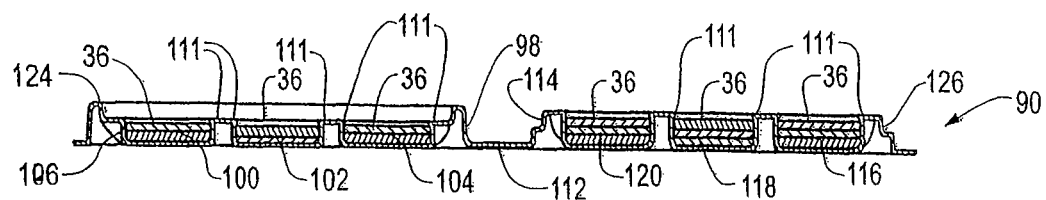

Outer wall or shell 96 in one embodiment is a foil, paper or paperboard outer shell that is glued to or otherwise adhered to upper and lower injection-molded product holders 98 and 114. Injection molded product holders 98 and 114 as best seen in FIGS. 18 to 20 each define three product compartments. Holder 98 defines compartments 100, 102 and 104.

Product carrying compartments 100, 102 and 104 each include peripheral sides 106 and a bottom 108, which in one embodiment are defined or formed integrally with upper product holder 98. Sides 106 extend from bottoms 108 a desired distance to hold a desired number of comestible sticks 36. As seen in FIGS. 20 and 22, in one embodiment, sides 106 of compartments 100, 102 and 104 extend from bottoms 108 of compartments 100, 102 and 104 a distance sufficient to accept two comestible sticks 36 in each of compartments 100, 102 and 104. Sticks 36 are stacked one on top of the other.

Figure 12:
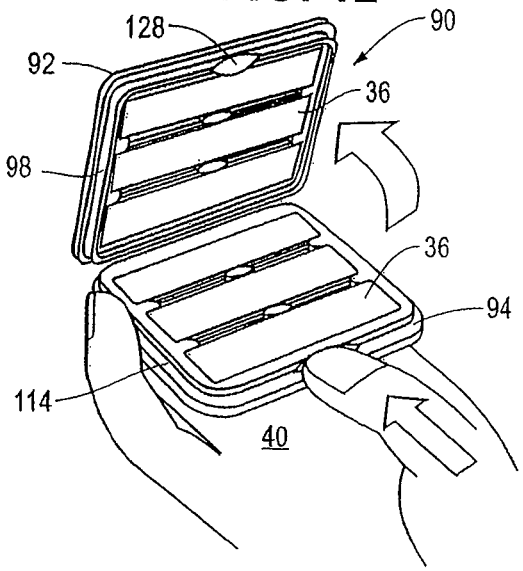
Figure 17:
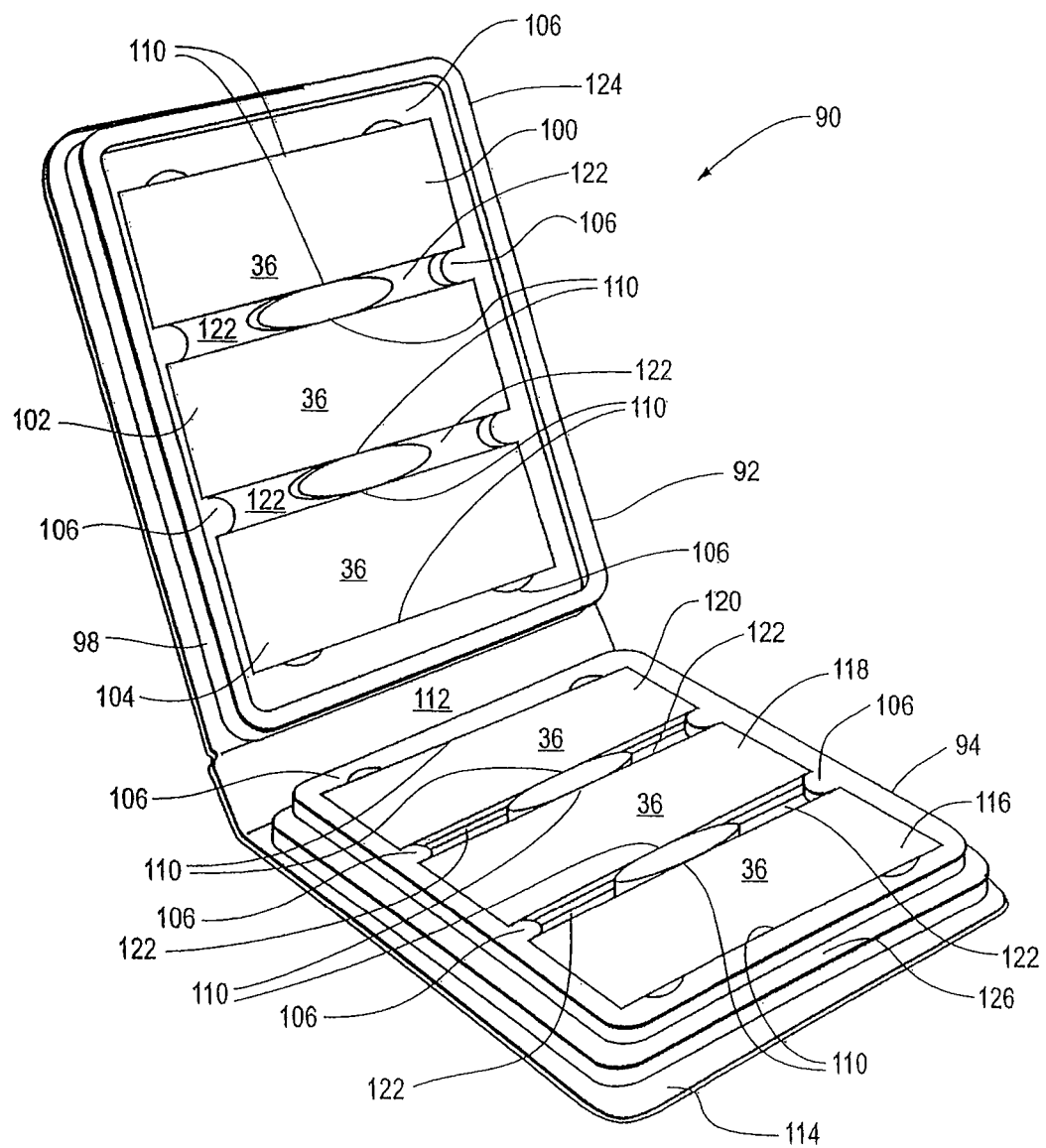

Top injection molded holder 98 also defines sidewalls 110 that each project slightly outwardly to fill some of the open space otherwise defined by compartments 100, 102 and 104. Projecting walls 110 place a slight compressive force on comestible products 36 when the products are loaded between walls 110. Projecting walls 110 have one or more extensions or radii 111 (see FIG. 20), which extend into the product carrying compartments 100, 102, 104 and overlap a portion or portions of comestible products to retain them in their respective product carrying compartments 100, 102, 104 and hold comestible products 36 removably in place. The compressive force applied by projecting walls 110 (lateral) and/or projections 111 (vertical) is sufficient so that, as seen in FIGS. 12 and 17, a consumer 40 can open lid 92 from base 94 without products 36 falling from compartments 100, 102 or 104 (for the remainder of the present description, projection walls 110 refer to one or both the lateral and/or compressive force). Consumer 40 can thereafter choose a comestible product 36 from any desired location within compartments 100, 102 or 104 or otherwise within dispenser 90.

While compartments 100, 102 and 104 are illustrated as holding two sticks of comestible products 36 each, those compartments can alternatively be sized to hold any suitable and desirable number of such products. Furthermore, while each of the compartments is shown holding the same number of products 36, the compartments can alternatively hold differing amounts of products 36, and the products in the respective compartments may be substantially the same, or may be different (e.g., different flavors in some compartment than others).

Figure 15:
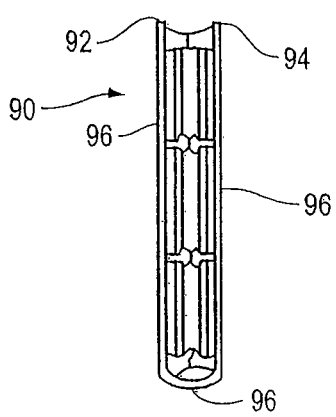

As seen best in FIGS. 15 and 22, outer shell or cover 96 in one embodiment wraps around hinge portion 112 and extends to cover the outer surface of bottom product holder 114. Alternatively, cover or outer shell 96 is made of multiple pieces of, e.g., paper or paperboard.

FIGS. 18 to 22 illustrate that top product holder 98, hinge portion 112 and bottom holder 114 in one embodiment are all made as a single injected molded or thermoformed piece. Alternatively, product holders 98 and 114 are made separately and are assembled to create package 90, for example, by being adhered in proper registry onto cover or shell 96. Forming holders 98 and 114 integrally with hinge section 112 simplifies assembly and provides a robust overall package in which the material used for plastic hinge 112 enables package 90 to be opened and closed multiple times without degrading or coming apart.

Bottom product holder 114 in many respects is a mirror image of top holder 98 and defines a mating or matching compartment 116, 118 and 120 for each compartment 100, 102 and 104 of top product holder 98. Compartments 116, 118 and 120 of holder 114 each include a bottom 108, peripheral sidewalls 106 and product holding projection walls 110 as described above for compartments 100, 102 and 104. FIG. 20 illustrates, however, that sidewalls 106 for compartments 116, 118 and 120 of holder 114 are sized to hold three comestible products 36 as opposed to the two products held in compartments 100, 102 and 104. Each mated pair of compartments, namely, pair 100/116, pair 102/118 and pair 104/120 holds a total of five products 36. Collectively, the compartment pairs hold a total desired number of fifteen comestible sticks 36.

Figure 14:
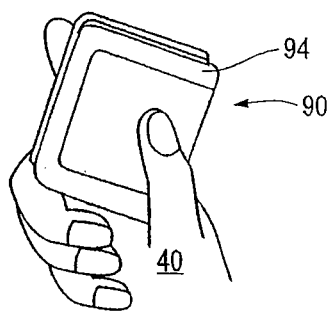
Figure 16:
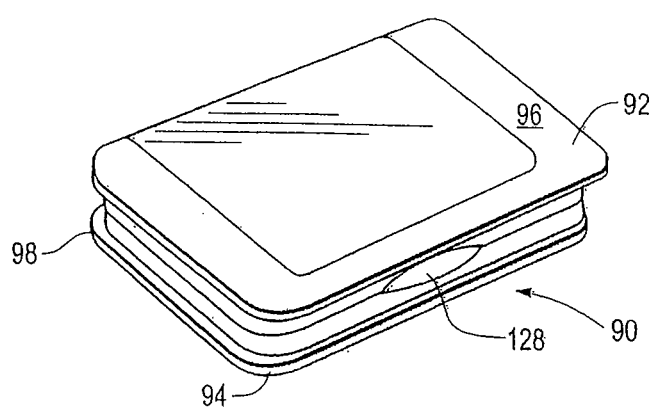

FIG. 16 illustrates an alternative embodiment for package 90, which has a single compartment pair, for example, using only compartments 104 and 120 immediately adjacent to hinge 112. In an embodiment, dispenser 90 of FIG. 16 holds a total of five comestible products 36. FIG. 14 illustrates that package or dispenser 90 is readily handled by consumer 40 and is generally wider and flatter than known comestible product packages (as is dispenser 60 and other embodiments discussed herein). The wider and flatter configuration is more conducive to being placed in one's coat, shirt or pants pocket.

While compartments 100, 102, 104, 116, 118 and 120 are illustrated as running in the same direction as hinge 112, the product compartments of dispenser 90 can alternatively run in a direction generally perpendicular to the direction of hinge 112 or further alternatively at any desired angle with respect to the direction of hinge 112 e.g., to hold and dispense products 36 of different lengths or different shapes.

FIGS. 18 and 19 illustrate that top and bottom holders 98 and 114 each provide openings 122 between projecting sidewalls 110 and non-projecting or peripheral sidewalls 106. Openings 122 enable consumer 40 to readily grasp a side of one or more of products 36 and pry the product from its compartment.

Sidewalls 106 forming the perimeter of holders 98 and 114 are formed in mating male and female pairs so that lid 92 and base 94 press fit or snap fit together to create a pseudo-airtight seal for product freshness and protection. Indeed, FIG. 20 illustrates that a projection perimeter 124 of top holder 98 of lid 92 fits into or mates with notch 126 formed by bottom holder 114 of base 94. The projection perimeter 124 and notch 126 extend all the way around the perimeter of holders 98 and 114, respectively, as seen in FIGS. 18 and 19. FIGS. 21 and 22 illustrate that projection perimeter 124 and notch 126 form a snap fit or press fit seal all the way around the perimeter of holders 98 and 114.

Figure 13:
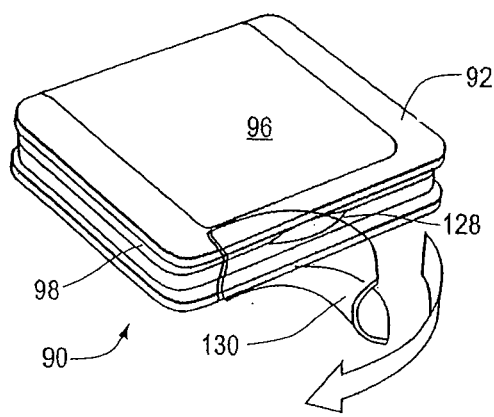

FIGS. 12, 13 and 16 illustrate that package 90 can define an indent 128 that helps consumer 40 open lid 92 from base 94. Alternatively, as seen in each of the FIGS. 12 to 22, package or dispenser 90 is flanged along its outer perimeter, which provides a structure by which consumer 40 can readily grasp and open package 90.

FIG. 13 further illustrates that a tamper-resistant seal 130 can be provided to cover the opening or non-hinge side of package 90. Seal 130 can be oriented or placed onto dispenser 90 in any suitable manner. Consumer 40 tears away the taped or adhered seal 130 to initially remove product from dispenser 90. Thereafter, consumer press fits or snap fits the perimeter seal together to reclose package 90 after removing such product.

As noted, package 90 in one embodiment is made of a plastic piece that defines the product holders and the hinge. In one preferred embodiment, the plastic is injection molded or thermoformed. The cover 96 in one embodiment is a pressure sensitive label made of paper or paperboard. Cover 96 is adhered to the plastic piece(s). Alternatively, cover 96 is made integrally with the plastic piece and the indicia is printed directly on the plastic.

Figure 24:
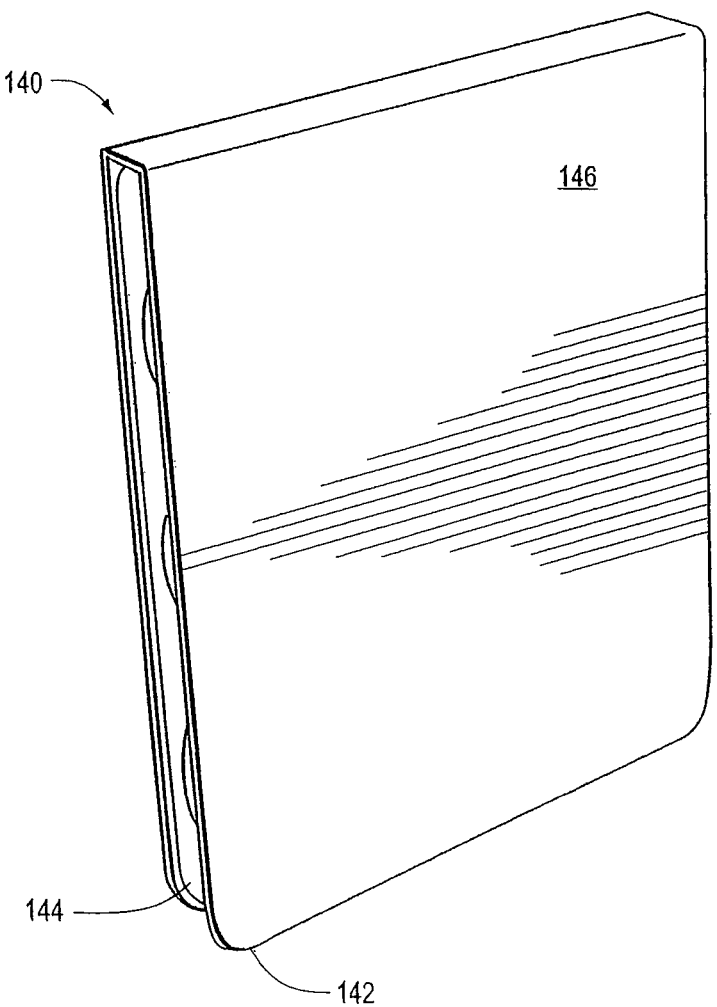

Referring now to FIGS. 23 and 24, a similar but alternative embodiment to package or dispenser 90 is illustrated by dispenser 140. FIG. 23 illustrates dispenser 140 opened. FIG. 24 illustrates dispenser 140 closed. Dispenser 140 includes a lid 142 and a base 144. The primary difference between dispenser 140 and dispenser 90 is that all fifteen comestible products 36 are stored and housed in base 144. Lid 142 does not store any products but instead serves to hingedly cover and uncover products 36.

As with dispenser 90, dispenser 140 includes in one embodiment an outer skin or shell 146, which in one embodiment is paper or a pressure sensitive label. Label 146 is wrapped using one or more pieces around the outside of a piece of injection molded or thermoformed plastic. The plastic piece includes in one embodiment a plastic lid portion 148, plastic base portion 150 and a hinge portion 152 that hingedly connects plastic lid portion 148 to plastic base portion 150 and consequently lid 142 to base 144. In an alternative embodiment, lid portion 148 and base portion 150 can be thermoformed or injected molded separately and connected together hingedly via skin or shell 146.

In illustrated embodiment, each compartment 154, 156 and 158 holds five sticks 36, totaling 15 desired sticks. The compartment alternatively, individually and/or collectively hold more or less than five and fifteen sticks respectively. It should also be appreciated that the alternative configuration of dispenser 140 can be molded to have only a single compartment, e.g., a five stick dispenser, or sized to hold any suitable amount of products 36.

Like with package 90, plastic base portion 150 forms multiple product holding compartments 154, 156 and 158. Each of those compartments uses the same type of apparatuses described above for removably holding products 36. In particular, each compartment includes or defines peripheral sidewalls 106 that separate the compartments and projecting walls 110 that frictionally and removably hold products 36 in place. Compartments 154, 156 and 158 also include or define openings 122 that enable consumer 40 to readily remove a desired product(s) 36 from a desired compartment 154, 156 or 158.

Package or dispenser 140, like dispenser 90, forms a snap fit or press fit pseudo-airtight seal around the perimeter of compartments 154, 156 and 158. Package 140 provides an alternative male projection portion 160 and an alternative notch 162 that mate to form the snap fit or press fit seal. Projection portion 160 includes rounded projections 164 that mate with rounded notches 166 of notch 162. The rounded notches 166 also extend into and through sidewalls 106 to help consumer 40 to remove products 36 from plastic base portion 150. That is, consumer 40 in removing products by grasping the long sides of the products via openings 122 or grasping the short sides of the products via notch 166. Projections 164 and notches 166 can also be provided with projection perimeter 124 and notch perimeter 126 of dispenser 90.

Alternative package 140 can have approximately the same overall size and shape as product 90. To that end, product 140, like product 90, is sized and shaped to fit readily into a consumer's pants or shirt pocket. Package 140 is also relatively airtight, rugged and can store products 36 unwrapped or wrapped individually in foil.

Figure 38:
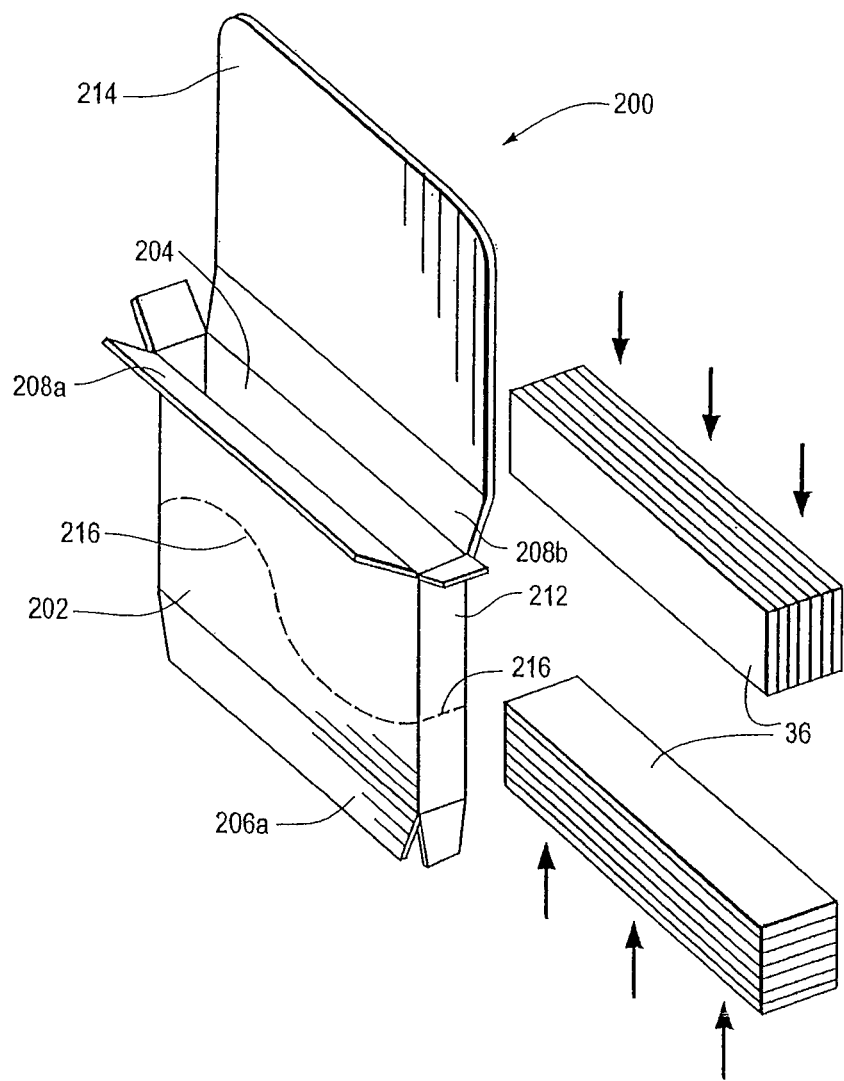

Referring now to FIGS. 25 to 31, still a further alternative embodiment for the comestible product package and dispenser of the present invention is illustrated by package 170. Package 170, in one preferred embodiment, is made of plastic or other type of relatively rigid composite material. FIGS. 38 and 39 illustrate an alternative but similar embodiment to package 170, where the concepts described for package 170 are applied to a paper or paperboard package or dispenser.

Package 170 in the illustrated embodiment, includes first and second portions or halves 172 and 174. Portions 172 and 174 in one embodiment each define about half the total volume of package 170. Alternatively, the volume defined by portions 172 and 174 is different or disproportionate. Portions 172 and 174 are held together via living hinge 176, which can be formed integrally or separately from portions 172 and 174. For example, portions 172 and 174 can be formed as separate pieces and taped or otherwise hingedly connected together via a paper or paperboard pressure sensitive label that adheres to the back of both portions 172 and 174. FIGS. 29 to 36, however, illustrate that in one preferred embodiment, package 170 is an integrally formed injection molded or thermoformed plastic or polymer structure.

Figure 28:
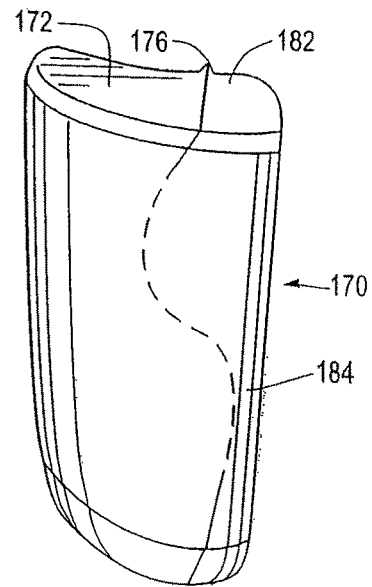

FIGS. 31, 32, 35 and 36 illustrate that portion 172 includes or defines a spacer 178. Portion 174 includes or defines a spacer 180. Spacers 178 and 180 help to determine how many comestible sticks 36 can be housed or stored inside portions 172 and 174. In the illustrated embodiment, spacers 178 and 180 enable eight products 36 to be stored in portion 172 and seven products 36 to be stored in portion 174. The total number of products stored in illustrated package 170 is fifteen. FIG. 28 illustrates an alternative embodiment, wherein only portion 172 is provided, which mates hingedly with an end 182. FIG. 28 illustrates a single stack version of dispenser 170, which holds a desired lesser amount of products 36, such as five or seven. Either version can hold as many products of varying size as desired. Portions 172 and 174 can hold the same or different amounts of the same or different products as desired.

Figure 25:
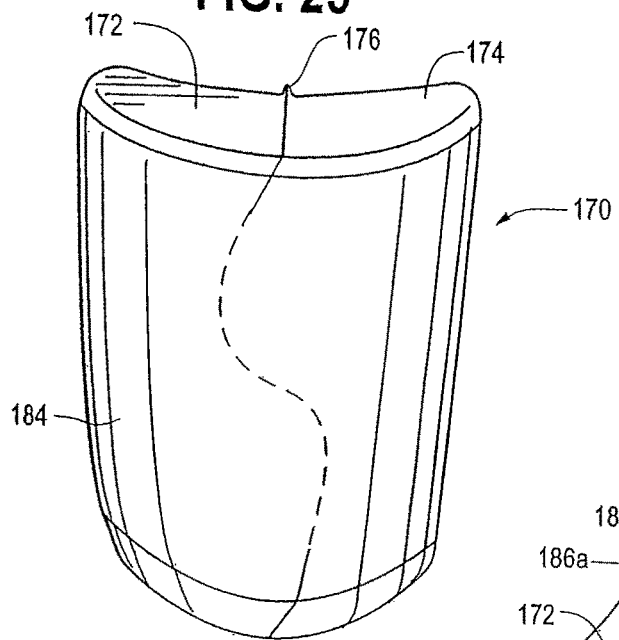
Figure 26:
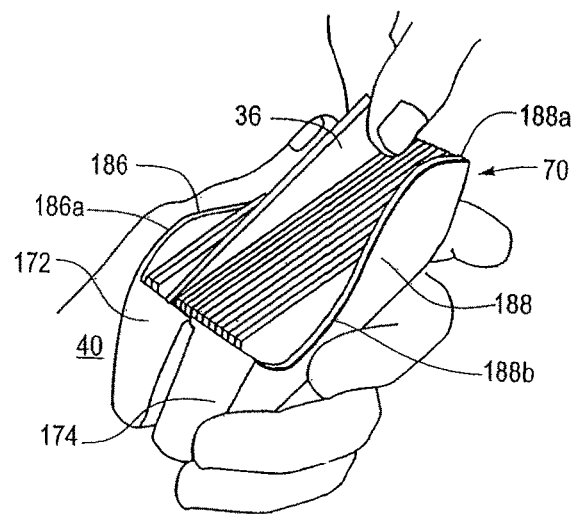

FIGS. 25 and 28 illustrate that dispenser 170 is provided initially with a pressure sensitive label 184, which includes suitable indicia, such as branding, ingredient, nutritional, and barcode information. Label 184 also acts as a tamper evident device, which enables consumer 40 to ensure that package 170 has not been disturbed or tampered with prior to use.

FIGS. 29 to 31 illustrate package 170 in an open position. FIGS. 33 to 37 illustrate package 170 in a closed position. Both sets of drawings, as well as FIGS. 25 to 28, illustrate that portions 172 and 174 define at their openings mating sinusoidal shaped edges 186 and 188, respectively. Both edges 186 and 188 include a tab or projection portion 186a, 188a, which mates with a corresponding open or notched portion 188b, 186b of the corresponding portion 172 or 174. The notches or dugout portions 186b, 188b of edges 186 and 188 enable the consumer 40 to reach and remove readily on or more product 36 from the corresponding portion 172 or 174.

Plastic package or dispenser 170 snap or press fits together after the product 36 is removed therefrom in one embodiment. The snap-fitting or press-fitting tends to provide an airtight seal that protects product freshness and also holds portions 172 and 174 together so that package 170 does not open and dispense product inadvertently.

Projection portions 186a and 188a each include or define snap-fitting apparatuses 190 and 192, respectively, that mate with the corresponding notched portions 188b and 186b. For example, apparatus 190 of projection portion 186a, as seen in FIG. 29, snap fits with the dugout portion 188b of edge 188. Likewise, snap fit apparatus 192 of edge 188a snap fits with dugout portion 186b of edge 186. FIG. 31 also illustrates snap-fitting apparatus 192, which includes a raised portion extending from the defining edge 188. That raised portion or apparatus 192 snap fits with notched portion 186b of edge 186.

Edges 186 and 188 form a continuous and consistent seam when mated, as seen from the outside of package 170 in FIGS. 33 and 37. Projecting snap-fitting apparatuses 190 and 192 lock or press fit the portions 172 and 174 together, as shown in phantom line in FIGS. 33 and 37, behind the seam created between edges 186 and 188.

Figure 27:
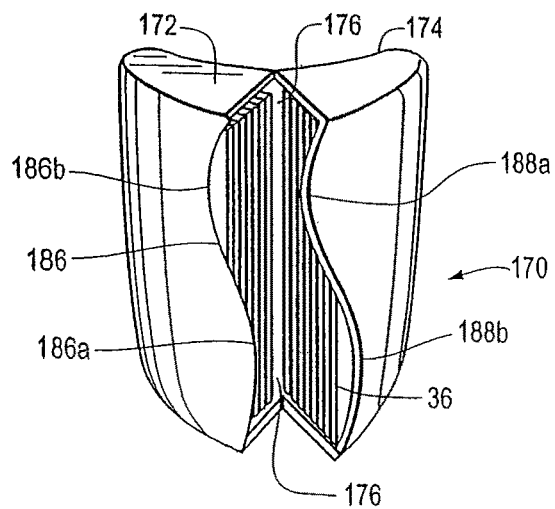

Package 170 provides a convenient and reusable comestible product holding and dispensing device. FIGS. 25, 27 and 28 illustrate that the shape of package or dispenser 170 can be arched so that the package fits more easily or more comfortably into pants or shirt pockets of consumer 40. FIGS. 29 to 37, on the other hand, illustrate a generally non-arched shape for package 170, although the front of package 170 as seen in FIG. 35 is bowed slightly in the middle, producing a slight oval shape. The backwalls of portions 172 and 174 leading to hinge 176 are virtually straight. The sides of portions 172 and 174 are rounded for ease of comfort and handling.

As seen in FIGS. 26, 27, 29 to 31, 35 and 36, the long side edges of sticks 36 are exposed to consumer 40 when the consumer opens package 170. That orientation is desirable so that the consumer can readily slide the outermost stick(s) 36 from one of the compartments 172 and 174 via dugout portions 186b and 188b of edges 186 and 188. Alternatively, sticks 36 could be rotated 90° from the illustrated orientation, so that the broadsides of comestible sticks face the consumer when package 170 is opened.

Although not illustrated, sticks 36 could be tacked or glued to spacers 178 and 180 or other parts of portions 172 and 174, respectively. Such gluing or tacking would tend to minimize the possibility of sticks 36 coming free from package 170 upon its opening, or while opened, especially when some or a majority of the comestible products 36 have already been consumed.

Referring now to FIGS. 38 and 39, a yet further alternative embodiment for the package and dispenser of the present invention is illustrated by package or dispenser 200. Package or dispenser 200 is a paper or paperboard version of plastic dispenser 170. Package 200 uses the same sinusoidal shape edge principal described above in connection with 170, which enables the user to crack or break open package 200 along a hinge line 218 and remove a product from one of the hinged portions via the dugout or opening defined by each of the sinusoidal shapes.

As illustrated, package 200 includes a front wall 202, a rear wall 204, a bottom wall 206, a top wall 208, sidewalls 210 and 212, and a cover or flap 214. Top wall 208 refers collectively to top wall portions 208a and 208b. Bottom wall 206 refers collectively to bottom wall portions 206a and 206b.

As illustrated in FIG. 39, showing package or dispenser 200 in the flat, a top side of sidewall portion 210 is adhered via adhesive or glue 34 to a bottom side of sidewall portion 210. Although not illustrated, it should be appreciated that bottom wall portions 206a and 206b are tacked or glued together as are top wall portions 208a and 208b. Flap 214 provides an initial tamper resistant covering over perforated sinusoidal line 216 provided on and defined by front wall 202. Consumer 40 first removes cover or flap 214 before cracking open package 200 along perforated line 216 and bending dispenser 170 in half via a fold line 218 to remove a comestible product 36 therefrom.

FIG. 39 illustrates that perforated line 216 extends through sidewalls 210 and 212 so that when consumer 40 splits package 200 in half or in two, the split occurs not only along front wall 202 but along the sidewalls 210 and 212. Back wall 204 remains together but is folded along fold line 218.

Products 36 can be loaded into package 200 in either the orientations illustrated in FIG. 38. Consumer 40 removes the products 36 from package 200 in the same manner as described above for package 170, removing one or more stick 36 via the dugout or cavity portion defined in each half by sinusoidal perforated line 216. When a product has been removed, the consumer closes the two portions of package 200 so that the edges defining line 216 are mated. Afterward, flap 214 is folded over line 216 to prevent the package from reopening between uses. To that end, flap 214 or front 202 can be provided with an amount of adhesive that helps flap 214 adhere or stick to front 202. Flap 214 and front 204 can alternatively be provided with a tongue and slot arrangement (illustrated in connection with FIG. 6), which holds the package together frictionally and/or adhesively between uses.

Package 200 is sized to hold fifteen sticks of comestible product 36 in one embodiment (e.g., seven sticks on one side of line 216 and eight on the other). Alternatively, package 200 can be sized to hold a lesser or greater amount. In one embodiment, sticks 36 are tacked or glued to top wall 208 and bottom wall 206 to help hold the products in place. Glue strips, such as strips 84 (FIG. 11) may be used as can any combination of hot or cold glue.

When initially packaged, package 200 can be wrapped by a suitable wrapper, such as a cellophane wrapper. That cellophane wrapper in one embodiment includes a tear strip that also serves as a tamper evident device. As seen in FIG. 39, suitable indicia as described above is provided in various places on package 200.

Referring now to FIGS. 40 to 46, a still another embodiment of the package and dispenser of the present invention is illustrated by package or dispenser 220. Package or dispenser 220 includes a cover 222 and a tray 224. Cover 222 as illustrated moves slidingly along tray 224 to expose one or more stack of comestible products 36. Cover 222 is generally a four-sided structure with a top 226, bottom 228 and sidewalls 230 and 232. Sidewall 232 refers collectively to sidewall portions 232a and 232b shown in FIG. 44. Sidewall portions 232a and 232b are glued or adhered together as indicated by adhesive 34 applied to the top side and bottom side, respectively, of sidewall portion 232a and 232b as seen in FIG. 44.

Tray 224 is generally a three- or five-sided structure as seen respectively in FIGS. 41 and 42 (showing three-sided) and 45 (showing five-sided). Tray 224 includes a bottom wall 234 and sidewalls 236 and 238. FIG. 45 illustrates that tray 224 can include additional top wall portions 240 and 242 that are bent over the top of the outer stacks of comestible products 36 to help hold those products in place. To that end, tack strips or glue strips 244 are provided on top wall portions 240 and 242 in one embodiment to help hold the comestible products 36 in place. Glue strips 244 can include any type of glue or adhesive described above. Glue can be applied directly to top wall portions 240 and 242 or be applied alternatively to a separate piece of paper 244, which in turn is adhered to portions 240 and 242.

As seen in FIGS. 42 and 44, cover or sleeve 222 includes or defines an opening 246 in one embodiment that enables consumer 40 to readily slide tray 224 in and out of cover or sleeve 232. Indeed, as seen in FIG. 41, opening 246 enables one-handed operation of package or dispenser 220. As illustrated, opening 246 in one embodiment has an oval shape; however, opening 246 can have any desired shape.

The relative sizes of sleeve 222 and tray 224 are selected so that consumer 40 can slide tray 224 in either direction against sleeve 222 to expose two product stacks and slide tray 224 from sleeve 222 in the opposite direction to expose the other stack of products 36. Sleeve 222 completely covers products 36 when the sleeve and tray are in registry. Nevertheless, products in the middle or center stack(s) are readily obtained. Package 220, like the other dispensers, exposes multiple stacks of products and enables consumer 40 to remove one or more products, selectively, from a desired and exposed stack. Further, dispenser 220 provides product access selectively from one or multiple open sides of the package.

FIG. 40 illustrates a larger size package, which in one embodiment includes three stacks of five sticks, totaling to the desired fifteen products 36. As before, the number of stacks can differ, the number of sticks in each stack can differ, and the total number and size of products 36 can vary. FIG. 43 illustrates a smaller version, which holds a lesser amount of product, e.g., five sticks 36. FIGS. 40 and 43 both illustrate that sleeve 226 in one embodiment includes or defines a notch 248 that also helps consumer 40 manipulate tray 224 within cover or sleeve 222, the packages are sized to hold any suitable amount of any suitably sized products.

FIGS. 41 and 46 illustrate that products 36 are individually provided in a foil wrapper. Each foil strip 36 is then placed inside an intermediate single stick wrapper 250. That is, an intermediate single strip wrapper 250 is provided for each foil-wrapped product 36. The single strip wrappers 250 are belly-banded together by a band 252. Band 252 is then adhered via adhesive 34 to a desirable location on bottom wall 234 of tray 224. Adhesive 34 can be any of the hot- or cold-type of adhesives described above. Adhesive strips similar to strips 244 may also be used.

Belly band 252 is tightly wrapped about single strip wrappers 250 such that when consumer 40 pulls on one of the foil products 36, the product 36 is removed from single stick wrapper 250 as opposed to single stick wrapper 250 coming free from belly band 252. Additionally, a suitable adhesive or wax can be applied between single strip wrappers 250 and/or between one of more of the outer single strip wrappers 250 and an inner surface of belly band 252.

Product sticks 36 are arranged as illustrated in FIGS. 41 and 42 so that the sticks slide through open ends of tray 224, which open ends are oriented 90° from open ends of sleeve or cover 222. In that matter, products 36 cannot inadvertently slide out of package 220. Although not illustrated, package 220 can include one or more securing devices, e.g., tongue and slot, that prevents tray 222 from sliding inadvertently out of sleeve 222.

As illustrated, package 220 includes any of the above-described indicia. Further, the package 220 is finally wrapped (not illustrated) by a suitable outer wrapper, such as cellophane. The outer wrapper in turn includes a tear strip which also serves as a tamper evident device.

Figure 47:
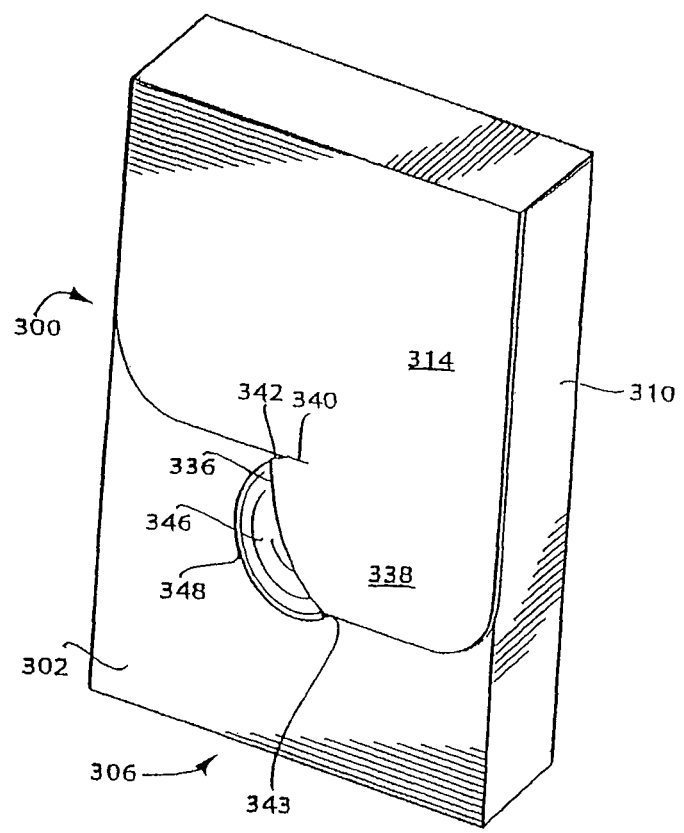
FIG. 47 is a perspective view of another embodiment of a package in accordance with the present invention.
Figure 48:
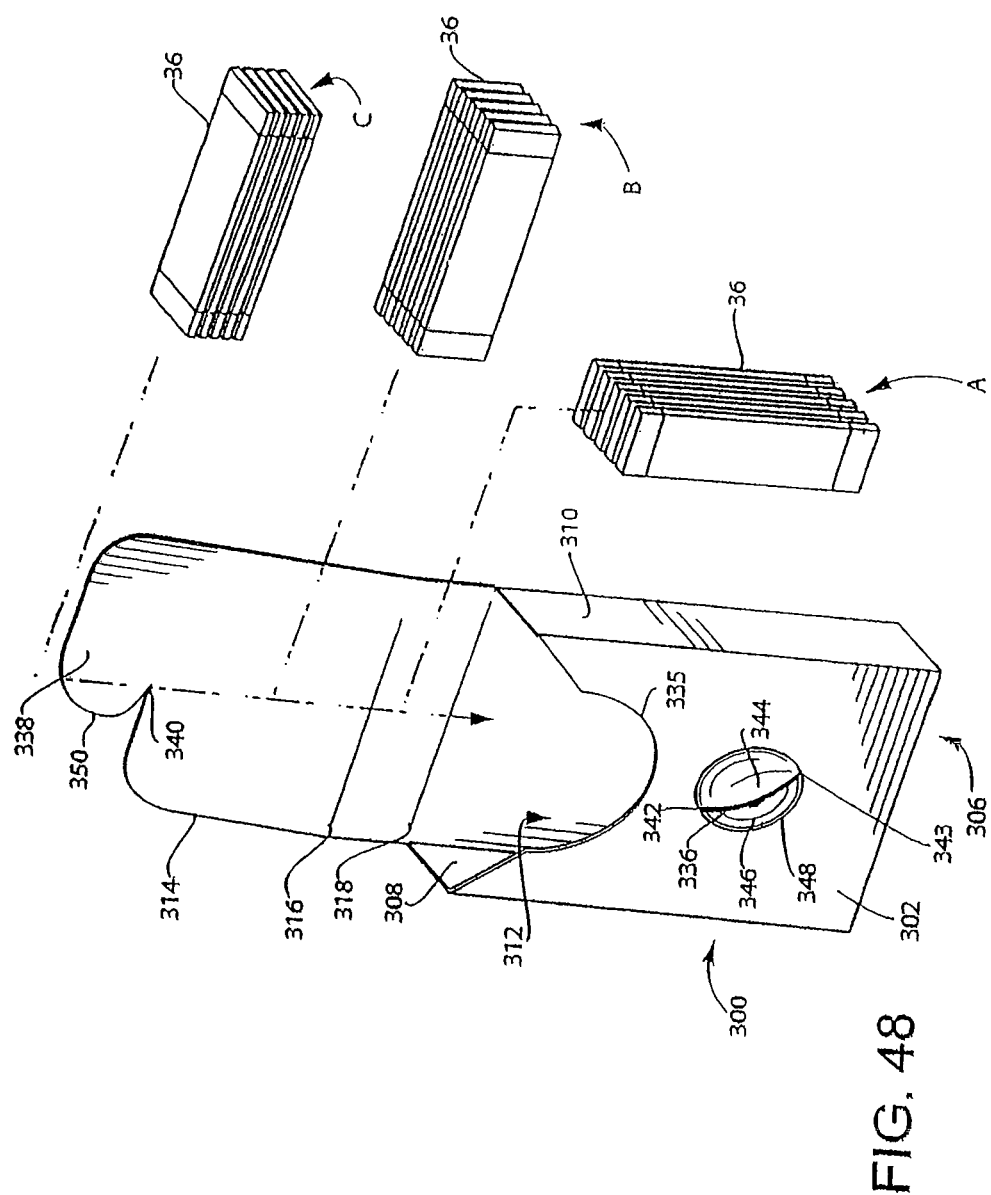
FIG. 48 is a perspective view of the package of FIG. 47 in an open position.
Figure 49:
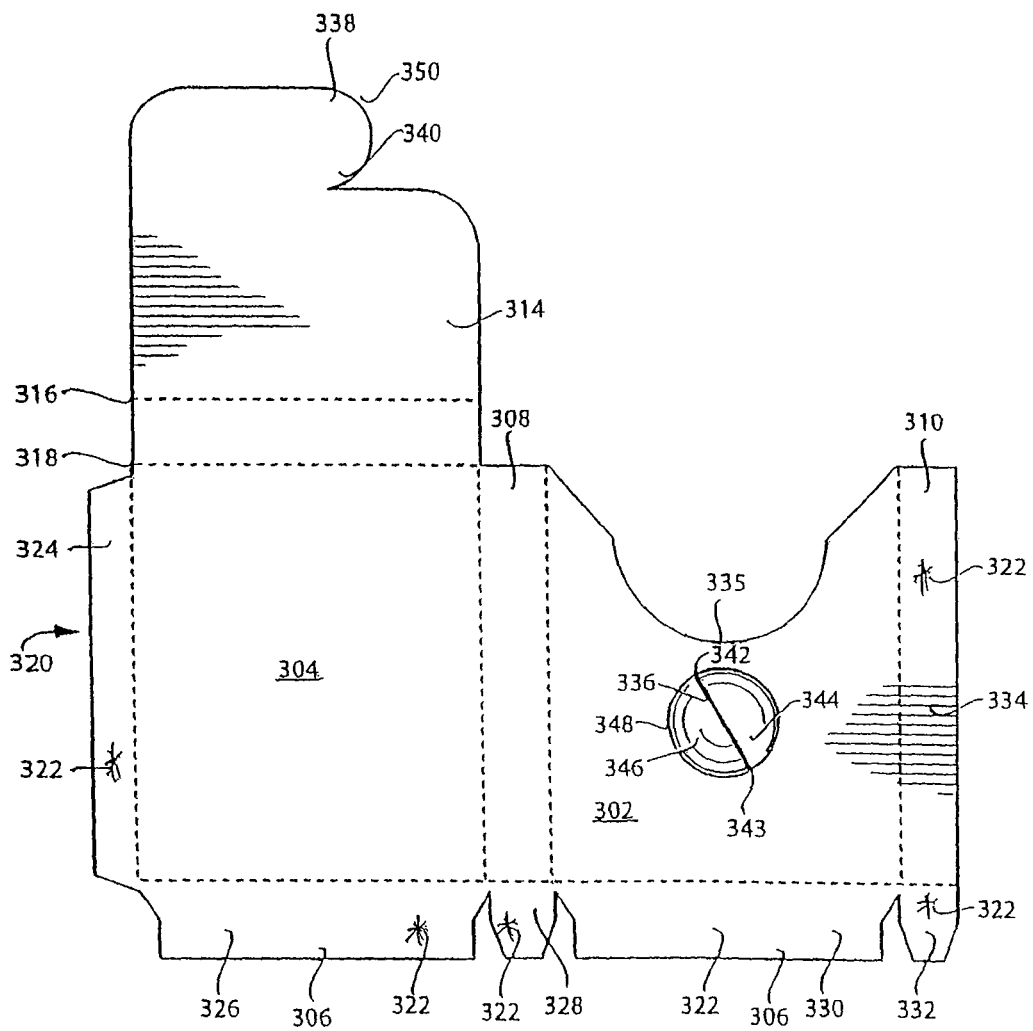
FIG. 49 is a plan view of a substrate that may be used to make the package of FIG. 47.

FIGS. 47-49 illustrate a further embodiment of the present invention wherein package or dispenser 300 has a front wall 302, a rear wall 304, a bottom wall 306 and opposing sidewalls 308 and 310. The walls cooperate to define a package interior 312. Rear wall 304 includes a flap 314. Fold lines 316 and 318 enable flap 314 to move relative to the walls. For example, flap 314 may moved to overlap a portion of front wall 302. Flap 314 may be integral to or attached to rear wall 304. In an embodiment, flap 314 is integral to or is otherwise an extension of rear wall 304.

In an embodiment, package 300 may be made from a substrate 320 as shown in FIG. 49. Substrate 320 may be made of any foldable material as previously discussed (i.e., paper, cardboard, plastic or combinations thereof). Substrate 320 is substantially flat and has plurality of panels corresponding to the walls and flap of package 300. In an embodiment, substrate 320 is a plurality of panels that are integral to each other. It is understood that adhesive 322 may be placed on tabs 324, 326, 328, 330, 332, 334 as necessary to maintain the panels of substrate 320 in the shape of package 300. Alternatively, the use of adhesive may be avoided by configuring tabs 324-334 in a tongue-and-slot arrangement as is commonly known in the art.

Comestible product 36 may be loaded into package 300 in any of the orientations A (vertical), B (horizontal), or C (stacked) as shown in FIG. 48. In an embodiment, front wall 302 may include a die cut edge 335 that exposes the product and permits ready removal of the product from package 300. In an embodiment, package 300 is configured to hold about 15 sticks (three 5-stick packs) of comestible product in orientation A. The skilled artisan will appreciate that the size of package 300 and the dimensions of package interior 312 may be varied as desired in order for package 300 to hold a lesser or a greater amount of product. Package 300 may be wrapped with an outer wrapper as previously discussed. Package 30 may also include labeling and advertising information as previously discussed.

Front wall 302 includes a slot 336 and flap 314 includes a protruding member 338. Slot 336 and protruding member 338 are adapted for cooperative engagement with each other. Slot 336 may be disposed on front wall 302 in any suitable orientation to cooperatively receive protruding member 338. In an embodiment, slot 336 is a diagonally disposed or is otherwise offset on front wall 302 as shown in FIGS. 47-49. Consequently, slot 336 may or may not be perpendicular to the bottom edge of front wall 302.

To close container 300, flap 314 is moved to overlap front wall 302. The length of flap 314 may be adapted so that when flap 314 overlaps front wall 302, protruding member 338 is at substantially the same position as slot 336. Protruding member 338 is then slid along front wall 302 in a direction to enter slot 336. The sliding of flap 314 continues along front wall 302 until protruding member 338 is inserted into and matingly engages slot 336. The mated engagement between slot 336 and protruding member 338 securely retains the contents of package 300 within the package interior. In an embodiment, a slit 340 disposed between flap 314 and protruding member 338 provides a friction fit between the protruding member, a slot edge 342 and the flap to hold the protruding member within slot 336 and keep package 300 closed. In a further embodiment, the outer edge 350 of protruding member 338 may include a notch (not shown) that may be used to retain protruding member 338 to either slot edge 342 or 343.

Package 300 may subsequently be opened by disengaging protruding member 338 from slot 336. This may be accomplished by sliding flap 314 along front wall 302 to move protruding member 338 away from slot 336. Once protruding member 338 is no longer in contact with slot 336, flap 314 may then be moved to expose the product to the consumer. The engagement and disengagement between the protruding member and the slot may be performed by a single hand of a user with relative ease.

In an embodiment, at least one slot 336 may be disposed between a debossed area 344 and an embossed area 346. Alternatively, slot 336 may be disposed adjacent to either one of debossed or embossed areas 344 and 346. The surface of debossed area 344 is lower than the surface of front wall 302 while the surface of embossed area 346 is raised above the surface of front wall 302 as shown in FIGS. 47-49. Areas 344 and 346 provide several advantages. The lowered surface level of debossed area 344 provides a guide for protruding member 338 during the closing of package 300. When flap 314 is moved from an open position (i.e., exposure of the package interior) to a position overlapping front wall 302, protruding member 338 aligns with debossed area 344. As the consumer slides flap 314 across the front wall, the recessed surface of debossed area 344 directs protruding member 338 into slot 336 for mated engagement.

Embossed area 346 provides a space in which protruding member may reside when inserted into slot 336. Provision of embossed area 346 thereby reduces the chance that the protruding member may interfere with the product and/or the wrapping of the product contained within package interior 312. The debossment-slot-embossment arrangement further contributes to the durability of the slot opening. The combination of the raised embossed area and the lowered debossed area provides a slot that endures repeated entry and exit of the protruding member without substantial degradation or reduction of the slot opening size. This enhances the integrity of the slot opening making package 300 well-suited for repeated use.

In an embodiment, the outline or outer perimeter 348 of areas 344 and 346 may define a geometric shape as shown in FIGS. 48 and 49. Non-limiting examples of geometric shapes suitable for outline 348 include a circle, an ellipse, a triangle, a square, a rectangle or a polygonal shape as desired. In an embodiment, the geometric shape is a circle as shown in FIGS. 48 and 49. Outer edge 350 of protruding member 338 may be varied as desired to correspond to the geometrical shape of outline 348. For example, if the geometrical shape for outline 348 is a circle, outer edge 350 may be arcuate to cooperatively fit within embossed area 346. If the geometrical shape of outline 348 is square, outer edge 350 may be substantially straight or a half-square shape to cooperatively fit under embossed area 346. The geometric shape may advantageously be used to draw attention to the cooperative engagement arrangement between the slot and protruding member. Geometric outline 348 may thereby draw consumer awareness to the reusability capability of package 300.

Figure 50:
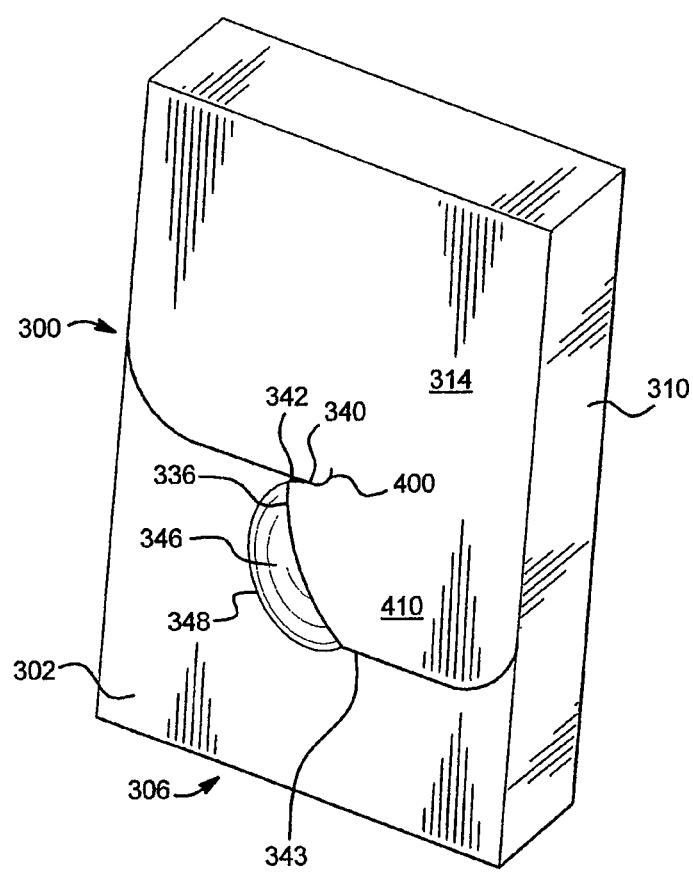
FIG. 50 is a perspective view of another embodiment of a package in accordance with the present invention.
Figure 51:
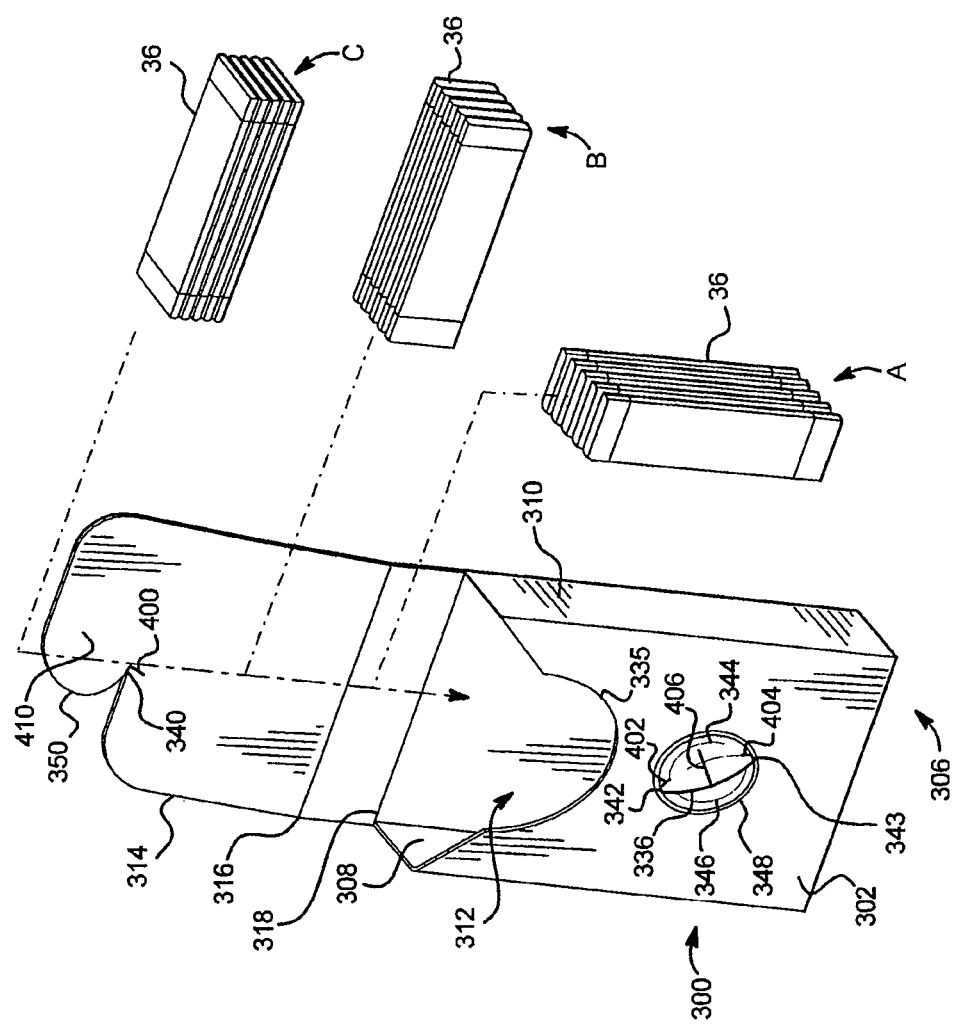
FIG. 51 is a perspective view of the package of FIG. 50 in an open position.
Figure 52:
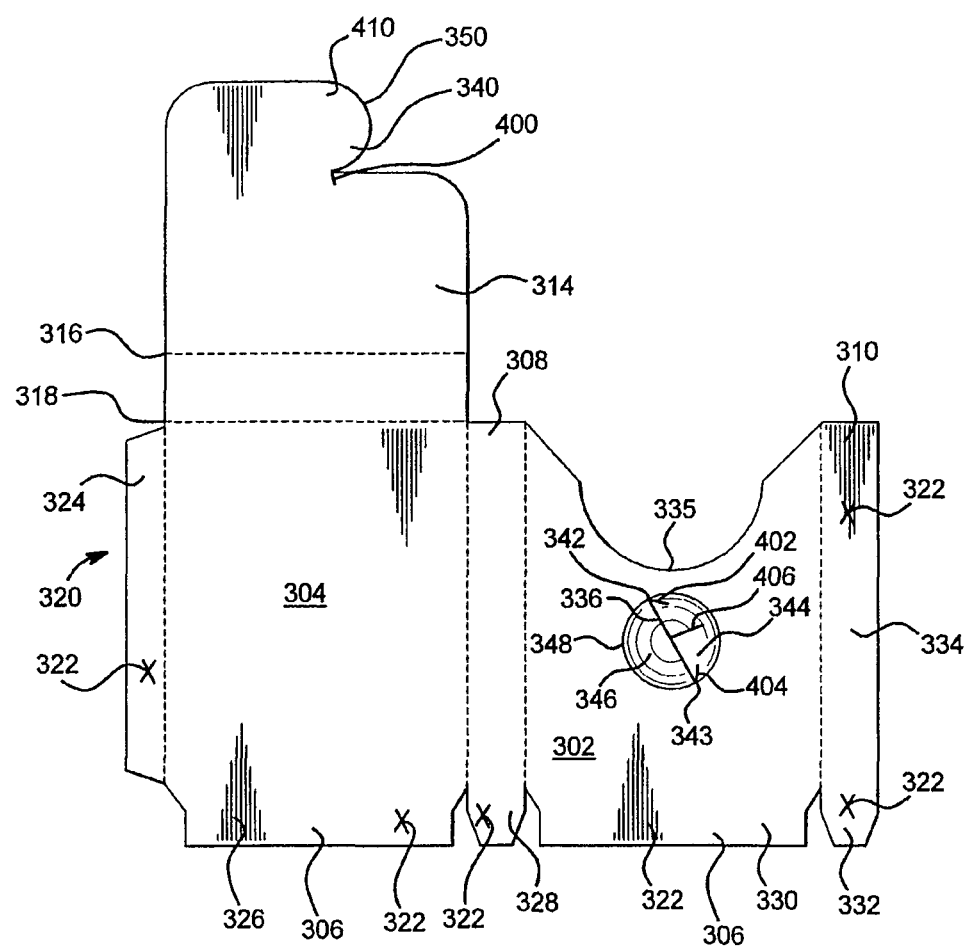
FIG. 52 is a plan view of a substrate that may be used to make the package of FIG. 50.

FIGS. 50-52 illustrate a further embodiment of the present invention wherein package or dispenser 300 has a body comprising a front wall 302, a rear wall 304, a bottom wall 306 and opposing sidewalls 308 and 310. The body includes a slot 336 and a flap 314 including a first portion 410 having a notch 400 adjacent the first portion, where the first portion 410 is engageable with the slot 336. Notch 400 makes engagement of the first portion 410 with the slot 336 easier, and reinforces the strength of the first portion 410.

As discussed above, slot 336 may be disposed on the body in any suitable orientation to cooperatively receive first portion 410. Consequently, slot 336 may or may not be perpendicular to the bottom edge of the body. In an embodiment, as shown in FIGS. 51 and 52, one or more lips 402, 404 may be present adjacent to the slot. These lips aid in engagement of the first portion 410 with the slot 336, and additionally make the package resistant to tear. Additionally optional is a slit 406, preferably perpendicular to the slot 336. Slit 336 likewise aids in engagement of the protruding member 338 with the slot 336.

Figure 53:
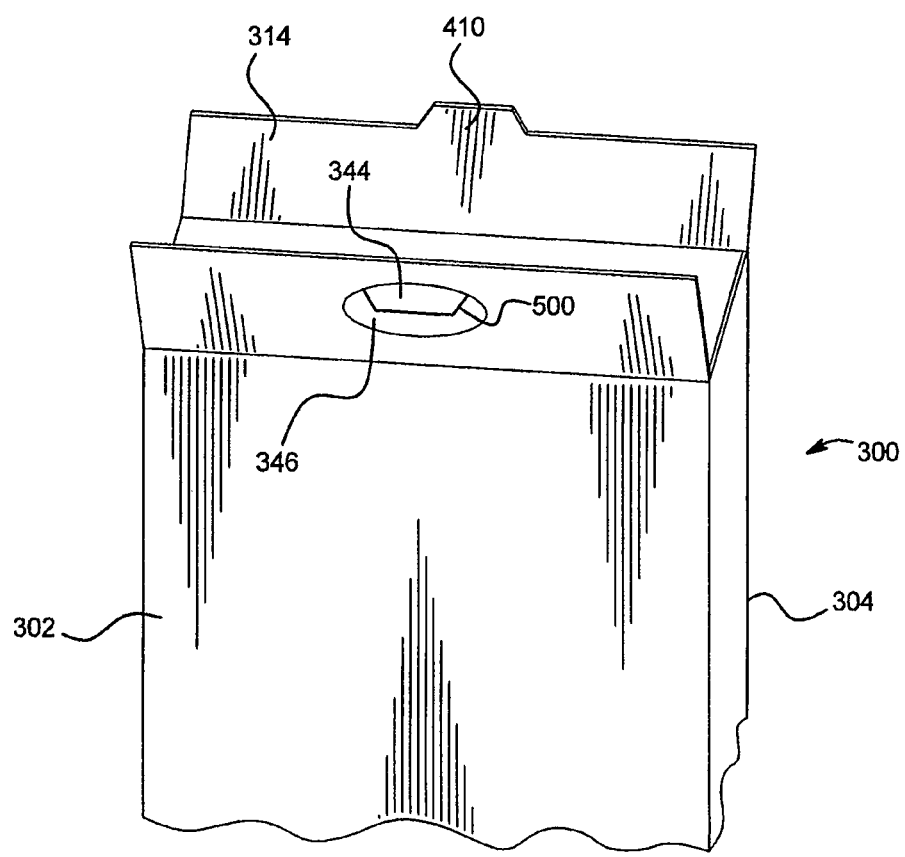
FIG. 53 is a partial perspective view of another embodiment of a package in accordance with the present invention.

FIG. 53 illustrates a further embodiment of the present invention. In FIG. 53, the package or dispenser 300 has a body comprising a front wall 302, a rear wall 304, a bottom wall (not shown) and opposing sidewalls. The body includes a multi-segmented slot 500 and a flap 314 including a first portion 410. The first portion 410 is engageable with the multi-segmented slot 500. Optionally present is are a debossed area 344 and an embossed area 346, discussed above. One or more slits (not shown) or notches (not shown) may additionally be present, as discussed above.

FIGS. 54-61c illustrate further embodiments of the package and methods of making the package. Although the package in an embodiment may house confectionery products, e.g. gum, the package may be used to house other products, e.g. pharmaceuticals. The package 510 may be portable, small, pocket-friendly, and sized to fit in the palm of a hand.

The package 510 may have a rear wall 516, a front wall 512, a movable flap 514 extending from the rear wall 516, and opposing sidewalls 520 and 522. In an embodiment, the front wall 512 may include a die cut edge 513 that exposes the products and permits ready removal of the products from the package 510. The movable flap 514 may include a protruding member 580. The flap 514 may be adapted to move relative to the walls 512, 516, 520 and 522.

In an embodiment, the flap 514 may be integral to or may otherwise be an extension of the rear wall 516. The package 510 may be made of any foldable material (i.e., paper, cardboard, plastic or combinations thereof as desired). The package may be made from a unitary blank or from a plurality of panels.

Figure 56:
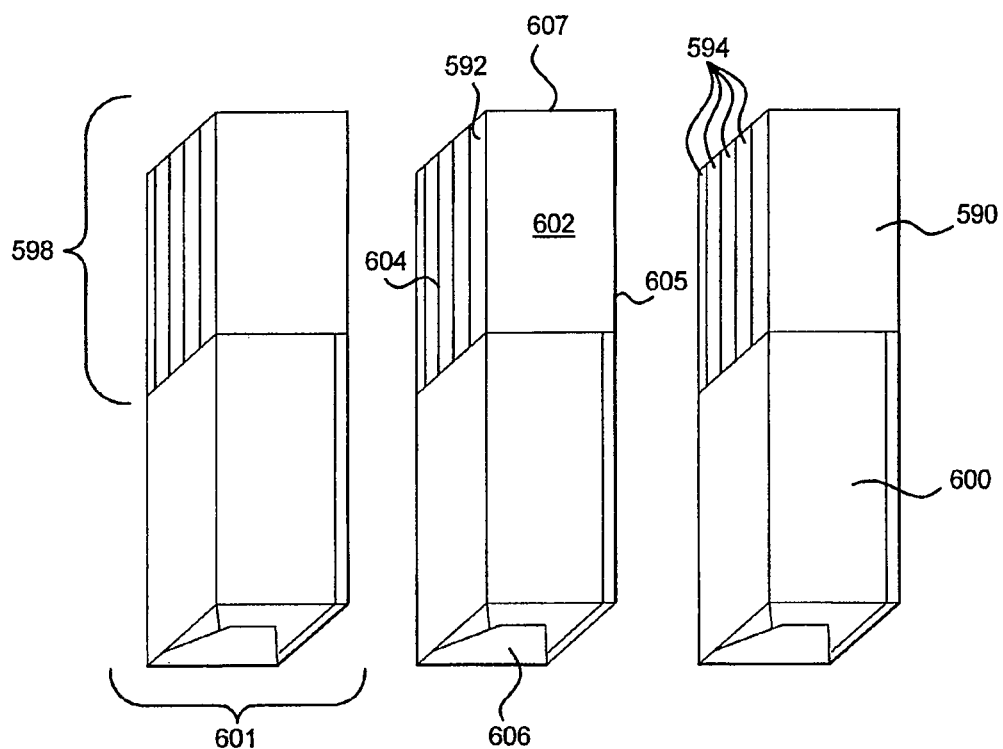
FIG. 56 is a perspective front view of the comestible product bundles.

As best illustrated in FIG. 56, the front wall may include a locking area 560 where a protruding member 580 of the flap 514 may be inserted into and secured in locking connection with the front wall 512 to enclose a package interior. This locking connection involves a locking edge 584 of the protruding member 580 and a lip 586 of the front wall 512. The connection may provide a friction fit to secure the flap 514 in a closed position. The locking connection may also prevent accidental escape of remaining product 590 from the package. The locking area 560 and the locking connection may be configured as disclosed in commonly-owned co-pending patent application entitled "Comestible Product Dispensers and Methods of Making and Using Same", U.S. application Ser. No. 11/609,455, concurrently filed herewith and which is hereby incorporated by reference in its entirety.

The comestible products 590 may include a plurality of individual pieces 594. In an embodiment, a piece 594 may have a front face, a back face, and a peripheral edge. The peripheral edge may include a first side edge, a second side edge, a bottom edge, and a top edge. As shown in an embodiment in FIG. 55, comestible products 590 may be arranged inside the package 510 in three 5-piece packs or bundles.

In an embodiment shown in FIG. 56, a plurality of comestible product pieces 594 may be wrapped in a bundle 601. The pieces 594 may be arranged in a stack 598 measuring at least one piece wide and at least two pieces deep. In the embodiment of FIG. 56, the stack 598 measures one piece wide and five pieces deep. Within the stack 598, the pieces 594 may be oriented in the same direction so that a back face of one piece 594 touches the front face of another piece 594. The stack 598 may have its own front face 602, back face 603, and peripheral edge (604, 605, 606, 607) as discussed above. A bundle wrapper 600 may be wrapped around a stack 598 to form a bundle 601. More than one bundle 601 may be arranged in a side-to-side manner.

The bundle wrapper 600 may maintain the pieces 594 in stacked formation and retain the pieces 594 against lateral movement within the bundle wrapper 600. In other words, the bundle wrapper may confine the comestible product so the pieces 594 do not rattle or shuffle within the package, leaving the package in disarray. With bundle wrapper 600, a piece 594 may not fall over and into the bottom of the package interior, thereby becoming less accessible to the consumer. Therefore, a comestible product piece may remain upright in the package regardless of whether it is adhesively attached inside the package. This way, the bundle wrapper 600 may retain the pieces 594 against lateral movement even if an adhesive loses its tack. Furthermore, the bundle wrapper 600 may prevent the pieces 594 from translating even after some pieces 594 have been individually removed from the bundle 601. The comestible products 590 may also remain as an orderly arrangement in the bundle 601 even during rough transport of the package. Moreover, a package may keep a plurality of comestible products in a tight stack that is a plurality of pieces wide and plurality of pieces deep while still holding the products against lateral movement with respect to one another. By having the stack at least two pieces deep, many pieces 594 may be arranged in a stack without sacrificing access to the pieces 594. In other words, a consumer can firmly grasp the uppermost piece 592 in the stack 598. In another embodiment, the bundle wrapper 600 may keep the pieces 594 together and in a stacked formation during the packaging process.

Figure 55:
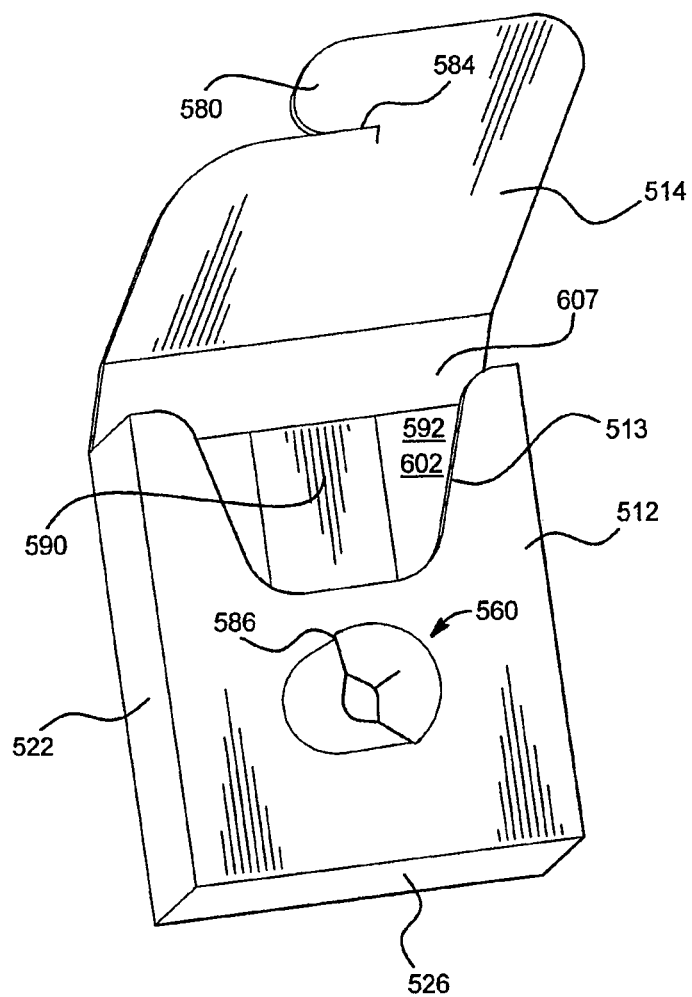
FIG. 55 is a perspective front view of the comestible product package of FIG. 54 in an assembled and open position.

FIGS. 55 and 56 illustrate embodiments where more than one bundle 601 may be placed side-to-side within the package interior. In an embodiment, a bundle 601 may be placed in the package interior so that only an uppermost piece 592 can be seen from the front of the package 510. FIG. 56 shows an expanded view of three bundles as they may be arranged within the package of FIG. 55. This three-bundle arrangement may efficiently use the space within the package interior and yet keep the products tightly held within the package 510. At the same time, this arrangement may not sacrifice access to the products since a consumer can firmly grasp the uppermost piece 592 in the bundle 601. In other words, this arrangement permits a consumer to touch the uppermost piece 592 along a portion of its front face 602 and along its entire top edge 607.

Figure 57A:
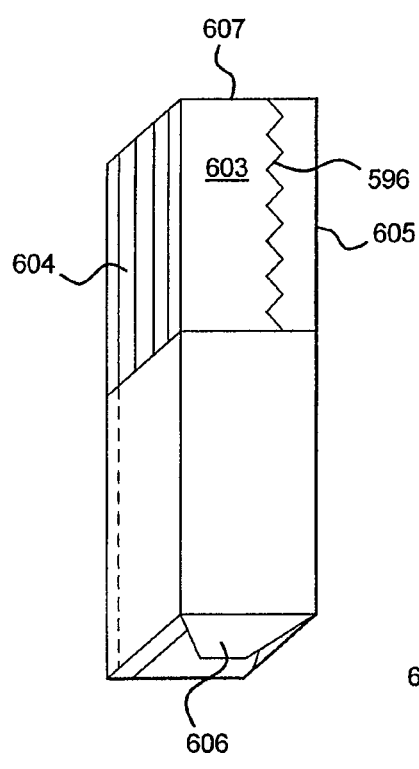
FIGS. 57a and 57b are perspective views of the back and front of the comestible product bundles of FIG. 56 respectively.
Figure 57B:
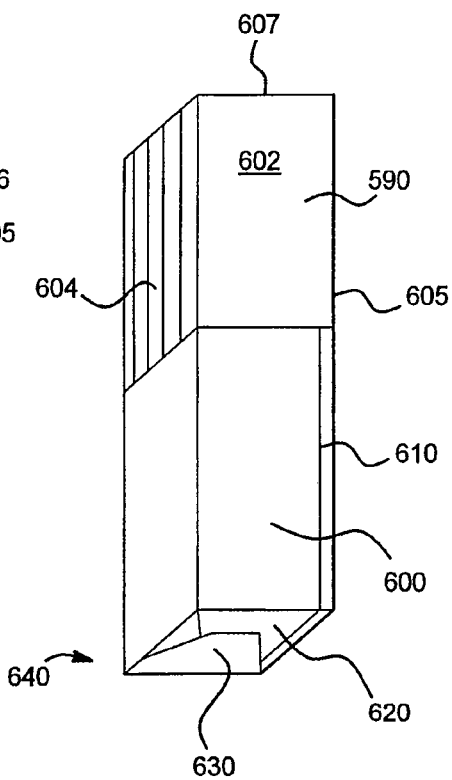

FIGS. 57a and 57b show other embodiments of the bundle wrapper 600 in relation to the stack 598 of pieces 594. The comestible products 594 may include individual wrappers to preserve freshness (shown at individual wrapper edge 596 in FIG. 57a). In another embodiment (not shown), the comestible products may be in direct contact with the bundle wrapper 600. The bundle wrapper 600 may cover the stack's bottom edge 606, leaving the stack 598 partially uncovered and allowing the pieces 594 to be individually handled at the top edge 607. This way, the bundle wrapper 600 may still be concealed under the die-cut edge 513 of the front wall 512, as shown in FIG. 55. That is, the package 510 may be opaque such that the bundle wrapper 600 may be hidden.

FIG. 57a shows a back view of another embodiment of a bundle while FIG. 57b shows a front view of the same embodiment. In this embodiment, the bundle wrapper 600 may wrap a stack that is up to two pieces wide and at least two pieces deep and contacts the stack 598 at portions of the first 604 and/or second 605 side edges, portions of the front 602 and back 603 faces and the entire bottom edge 606. In other words, the bundle wrapper contacts the stack 598 on five sides but does not contact the top edge 607. The bundle wrapper sheet 600 may be folded over itself at a bundle wrapper edge 610 so that the sheet 600 extends over the entire width of the front face 602 of the stack 598. Adhesive may be applied to glue the bundle wrapper edge 610 down. The adhesive may adhere the bundle wrapper edge 610 back to the bundle wrapper 600 or, alternatively, to the front face 602 of the stack 598. In an embodiment, the adhesive may be a wax or a cold-type adhesive. A hem (at 640) of the bundle wrapper 600 may be folded inward to cover the bottom edge of the stack 598, first to form a first flap 620 and then to form a second flap 630. In an embodiment, the bundle wrapper may be folded in the same manner as shown in FIGS. 57a and 57b but the stack may be facing the opposite direction. In this embodiment, the individual wrapper edge 596 and the edge 610 of the bundle sheet are located on a common face of the bundle (e.g. back face 603).

In another embodiment, the bundle wrapper may form a U-shaped channel around the pieces 594. In this embodiment, the bundle wrapper may wrap a stack 598 that is up to two pieces wide and at least two pieces deep and may contact the stack 598 on portions of its first 604 and/or second 605 side edges and portions of the front 602 and/or back 603 faces. FIG. 58a shows a back view of a similar embodiment while FIG. 58b shows a front view of that same embodiment. Here, the bundle wrapper 600 does not fold over itself. Instead, the bundle wrapper may be directly adhered to one or more pieces 594 using an adhesive. This adhesive may be either a cold-type adhesive or wax. In an embodiment, the edges 610, 612 of the bundle wrapper cover a portion of the front face 602 of the stack 598. In another embodiment, the edges 610, 612 of the bundle wrapper may stop short of the front face 602 of the stack 598. In a further embodiment, the bundle wrapper may be folded in the same manner as shown in FIGS. 58a and 58b but the stack may be facing the opposite direction. In this embodiment, the individual wrapper edge 596 and the edges 610, 612 of the bundle sheet are located on a common face of the stack (e.g. back face 603).

The bundle wrapper 600 may be configured in numerous ways to retain a stack that is exactly one product wide and at least two products deep against lateral movement. At a minimum, the bundle wrapper 600 may contact the stack on only one side, or more specifically at a portion of one of its side edges 604 or 605, in which case the bundle wrapper 600 must be adhered to each piece 594 at that side edge 604 or 605. At a maximum, the bundle wrapper 600 may contact the stack on five sides as shown in the embodiment of FIGS. 57a and 57b. Regardless of how the bundle wrapper wraps around the stack, the bundle wrapper 600 may not contact the top edge 607 of the stack. Furthermore, adhesive can be placed in various configurations between the stack and the bundle wrapper to maintain the bundle wrapper 600 around the stack 598.

In another embodiment (not shown), the bundle wrapper 600 may wrap a stack 598 that is at least two pieces wide and at least two pieces deep. In other words, a single bundle wrapper may be used for multiple rows of comestible products. A single bundle wrapper 600 may weave in and out of a stack 598 that is at least two pieces wide and at least two pieces deep to retain pieces 594 against lateral movement with respect to one another. In an embodiment, the bundle wrapper 600 may weave in and out a stack to separate every first 604 and second 605 side edge. In this embodiment, each piece may or may not be adhered to the bundle wrapper 600. In another embodiment, the bundle wrapper 600 may weave in and out of every two sets of first 604 and second 605 side edges as long as each piece 594 is adhered to the bundle wrapper 600 on at least a portion of either a first 604 or second side 605 edge.

In another embodiment, the pieces 594 may be retained against lateral movement inside the package 510 not by a bundle wrapper but by a plurality of individual wrappers. For example, each piece 594 in the stack may be additionally placed inside a single stick wrapper. That is, a single strip wrapper may be provided for each foil-wrapped piece 594. In an embodiment, a single strip wrapper may wrap an individual piece 592 from a bottom edge 606 and contact that piece 592 on five sides. In another embodiment, a single strip wrapper may wrap an individual piece 594 on four sides, similar to the belly band of FIG. 46 (e.g. not touching the bottom 606 or top 607 edges). Adhesive may be applied to and sandwiched between the single stick wrappers to form a bundle 601. In another embodiment, a strip of adhesive may be applied to the single stick wrappers on at least a portion of the first 604 and/or second 605 side edges to form a bundle 601.

In an embodiment, the pieces 594 may be retained against lateral movement inside the package 510 without a bundle wrapper 600 at all. The pieces may be individually wrapped for freshness using any known means, e.g. foil wrapped chewing gum sticks. In one embodiment, adhesive may be applied directly between individually wrapped pieces 594. For example, adhesive may be sandwiched between the faces 602, 603 of foil-wrapped individual pieces 594 to form a bundle. In another example, a strip of adhesive may be applied to at least a portion of the first 604 and/or second 605 side walls of the pieces 594 to bind the pieces as a bundle 601.

The pieces 594 may be wrapped with one material from one end and wrapped with a second material from another end. In an embodiment, the pieces 594 may be individually wrapped for freshness from a top edge 607 and wrapped as a bundle from a bottom edge 606. The second material may restrict the pieces against lateral movement inside the package 510. For example, each piece may be individually foil-wrapped from a top edge 607 and exposed at a bottom edge 606. Then, the pieces 594 may either be collectively wrapped in a bundle wrapper 600 or individually wrapped in a plurality of single stick wrappers 250 at a set of bottom edges 606 to form a bundle 601. In an embodiment, adhesive may be applied to one of the materials. Furthermore, the adhesive may be sandwiched between the pieces 594 or applied to side edges 604, 605 as discussed above.

In an embodiment, the bundle wrapper 600 may include a foil layer. The bundle wrapper may also include a wax paper layer (not shown) attached to the foil layer. The foil layer in an embodiment may be a metal foil such as aluminum foil or other light metal foil. The wax paper may be any type of wax paper known to those of skill in the art. The wax paper layer may adhere to the foil layer via a standard adhesive. Alternatively, the foil layer can be sprayed on or otherwise applied to the paper side of the wax paper layer. A plurality of comestible products 590 may reside on and attach to the foil side of the bundle wrapper 600.

A weak adhesive may be used to adhere each piece 594 of the bundle 601 to the bundle wrapper 600. The adhesive may be a wax or of the cold type so as not to degrade over time from volatile ingredients in the comestible product 590. The adhesive may be applied to one or more regions of the bundle wrapper sheet 600 (e.g. along the inside hem at base 640 and along bundle wrapper edge 610). Alternatively, the adhesive may be applied directly to one or more sides of the stack 598. The adhesive may be applied in a single adhesive area of the stack or can be beaded or applied for each piece 594. In either case, the bundle wrapper may be folded around the stack 598, thus activating the adhesive with pressure to secure the wrapper 600 closed and to releasably attach the comestible products 590 to the wrapper 600 in the same step. By folding and adhesively attaching the bundle wrapper around the stack in one step, the manufacturing process becomes more efficient. This way, the same adhesive may hold the bundle wrapper 600 in a wrapped position around the products 59 and may also hold the comestible products 590 to the bundle wrapper 600. Therefore, the adhesive may prevent the pieces 594 from escaping the bundle wrapper 600 and sliding out. At the same time, the adhesion may be weak enough so that a consumer can extract a single piece 592 from the bundle 601 with a gentle pull. The adhesive may include any type of adhesive suitable for packaging comestible goods known to those of skill in the art. In an embodiment, cold-type glue can be used for the adhesive. In another embodiment, wax can be used.

Wax may be applied using different techniques. For example, a heat source (not shown) may apply localized heating to heat a particular area of the bundle wrapper 600. Heating the bundle wrapper may indirectly heat the wax in a desired area so that the wax melts and dries between the bundle wrapper 600 and the comestible products 590. The heat source can be of any type (i.e. conductive heating, convective heating, radiated heating, or any combination thereof). Alternatively, the wax may be melted and dried directly between the bundle wrapper 600 and the comestible products 590.

A bundle 601 may also be attached to the interior of the package 510. In an embodiment, a bundle 601 may be attached by its bottom edge to the interior side of the bottom flap 524. In another embodiment, the bundle 601 may be attached to one or more of the interior walls of the package 510 (e.g. the interior of the rear wall 518, front wall 512, or side walls 520, 522). This may prevent the bundles from falling out of the package 510. This way, the entire package of FIG. 55 can be inverted, shaken, or roughly handled without losing any pieces 594. In an embodiment, the bundles 601 may be attached to the package 510 using a cold-type adhesive. In another embodiment, the cold-type adhesive may be applied to the base of the bundle at the bottom edge 606. In a further embodiment, the cold-type adhesive may be applied to an interior of the bottom wall 524 of the package 510. The cold-type adhesive may be applied in different configurations or patterns. For example, the cold-type adhesive may be applied as a continuous strip of adhesive or as a stitched line of adhesive.

It should be appreciated that it may be possible to press-fit the comestible products 590 within the bundle wrapper 600, where tension holds the comestible products 590 in place, but where the consumer can still readily retrieve and release the products. Even in this situation, the bundle wrapper 600 must still be attached to the interior of the package 510.

It should also be appreciated that it may be possible to press-fit the bundle wrapper 600 into the package 510, where tension holds the bundle 601 in place, but where the consumer can still readily retrieve the products 590. Even in this situation, the comestible products 590 must still be releasably attached to the bundle wrapper 600.

Figure 60:
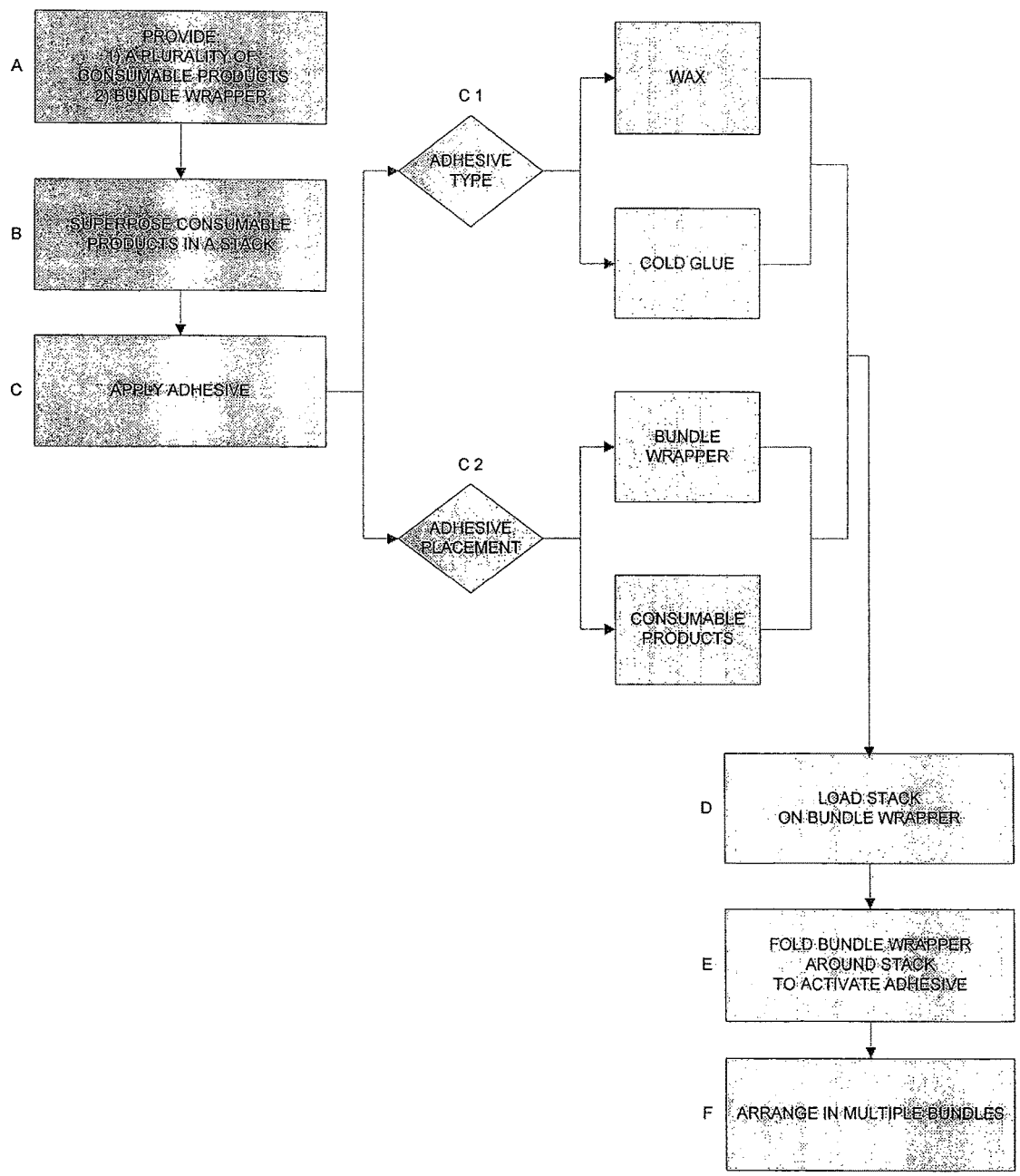
FIG. 60 is a flow chart showing the steps for providing a bundle of comestible products.

Further embodiments are also concerned with methods for providing a bundle 601 of comestible products. FIG. 60 is a flow chart showing the steps for such methods. In accordance with an embodiment, a plurality of comestible products and a bundle wrapper may be provided (step A). In an embodiment, the comestible products may generally be elongated in shape. The comestible products may then be arranged to form a single stack (step B) as discussed above.

Next, a weak adhesive may be applied between the stack 598 and the bundle wrapper 600 (steps C, C2). In one embodiment, the adhesive may be applied directly to the stack of comestible products, for example at the bottom edge 606 of the stack. Alternatively, the adhesive may be applied to a region of the bundle wrapper sheet 600, for example along the inside hem (under 620 and 630 in FIG. 57b) and/or under the side edges (e.g. 610). The adhesive may be a wax or a cold-type adhesive so as to be increasingly resilient against volatile ingredients in the comestible products (step D1).

In either case (of step C2), the stack 598 may be positioned in relation to the bundle wrapper 600 in such a way that at least a portion of a length of the stack hangs off an edge of the bundle wrapper (step D). In other words, the bundle wrapper 600 may envelop a partial surface area of the stack 601. The bundle wrapper may be folded around the plurality of comestible products, thus activating the adhesive with pressure to secure the wrapper closed and to releasably attach the comestible products 590 to the wrapper 600 during the same step (step E). In combining the folding step and adhesion step into one step, the efficiency of the process is increased. The adhesion between the bundle wrapper and the pieces 594 remains weak enough for a consumer to remove a piece 592 from the bundle 601 with a gentle pull. In other words, the adhesive may be strong enough to prevent the products 590 from escaping the bundle wrapper 600 but at the same time be weak enough so a consumer can extract a single piece 594 from the bundle wrapper 600.

As shown in FIG. 55, the package 510 may contain more than one bundle 601 within the package interior. At least two bundles may be collated during the packaging process to be incorporated into a single package 510 (step F).

Figure 54:
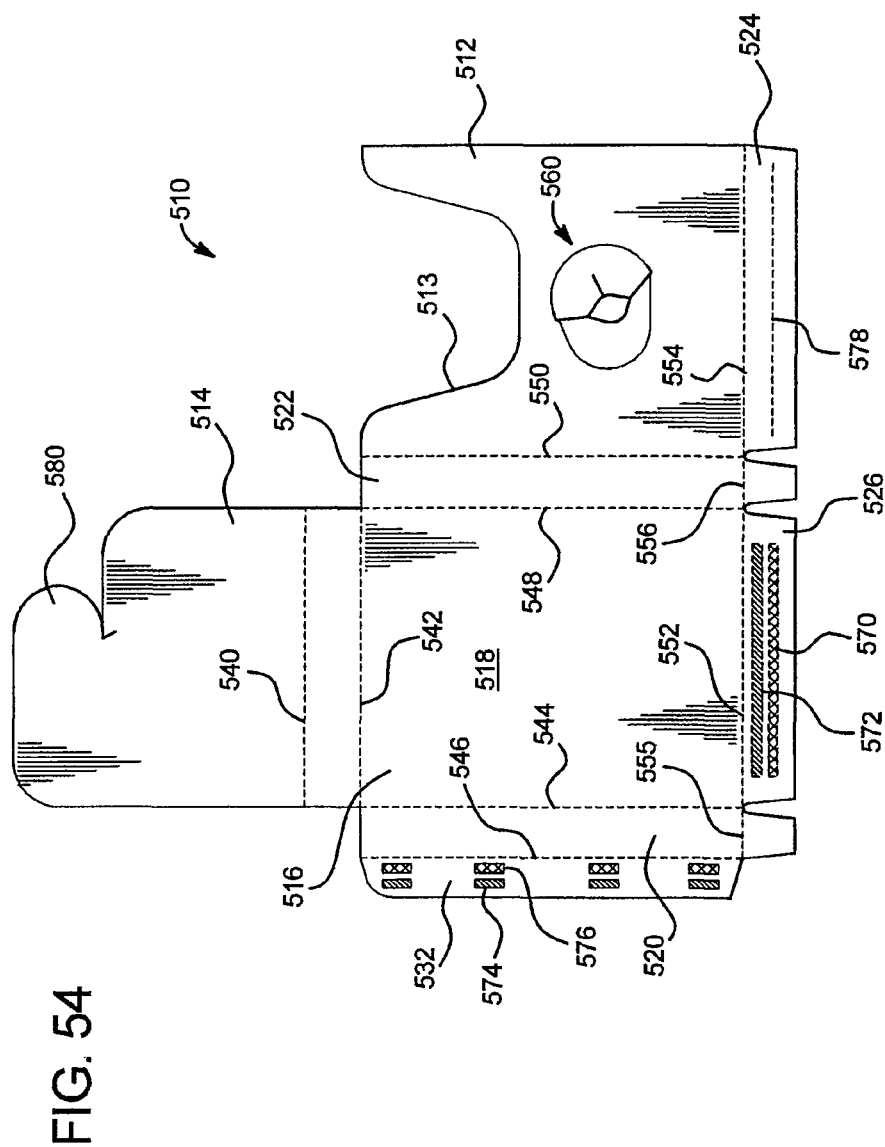
FIG. 54 is a plan view of the exterior side of another embodiment of the comestible product package

In accordance with further embodiments of the present invention, methods for providing a comestible product package are provided. In carrying out the methods, a package 510 may be provided. The package 510 may include several features designed to promote adhesion. For example, the package blank 510 may be varnished on its outermost side (the side as shown in FIG. 54) with a few exceptions. In an embodiment, a bottom wall 524 and a side flap 532 may not be varnished so that adhesive can better attach to the package blank 510 in these areas. In another embodiment, the bottom flap 524 may include a groove line 578 so that an adhesive 570, 572 can settle within the grooves of the groove line. In a further embodiment, the bottom flaps 524, 526 and a side flap 532 may not be printed on interior or exterior sides. In yet another embodiment, a combination of these features (strategic varnishing, printing placement, and grooves) can be used at the same time for increased adhesion.

Also in accordance with the methods, an adhesive configuration may be applied to certain areas of the package 510. For example, the side flap 532, the interior of the bottom flap 526, or the exterior of the bottom flap 524 may include an adhesive configuration (steps J and T of FIG. 61a and steps JJ and TT of FIG. 61c) as discussed below. As shown in FIG. 54, both a cold-type glue (572 and 574) and hot-melt (570 and 576) may be used in conjunction with one another. Hot-melt may be used for immediate tacking and cold-glue may be used for long-term adhesion. The cold-type glue and hot-melt may be arranged in different patterns to form various adhesive configurations. In an embodiment, cold glue 572 and hot-melt 570 may be applied in parallel strips, as shown on the bottom flap 526 in FIG. 54. This adhesive configuration may be capable of withstanding everyday wear and tear. In another embodiment, cold glue 574 and hot-melt 576 may be applied in parallel stitches, as shown on the side flap 532 in FIG. 54. In a further embodiment, cold glue and hot-melt may be applied in an alternating, single file stitch (not shown). This adhesive configuration may be used when there is limited space on the package blank 510 to apply the adhesive 574, 576.

The side flap 532 may be formed to extend from different parts of the package 510. Therefore, the adhesive configuration on the side flap 532 may adhere the side flap 532 to different walls of the package 510. In an embodiment, an adhesive configuration may secure a sidewall 520, 522 with the front wall 512. For example, the side flap 532 may extend from a sidewall 520 and the front wall 512 may extend from a sidewall 522. Also, the side flap 532 may extend from a sidewall 522 and the front wall 512 may extend from another sidewall 520. In another embodiment, an adhesive configuration may secure a sidewall 520, 522 to the rear wall 516. For example, sidewalls 520, 522, the front wall 512 and the side flap 532 may extend from a common side of the rear wall 516.

Figure 61A:
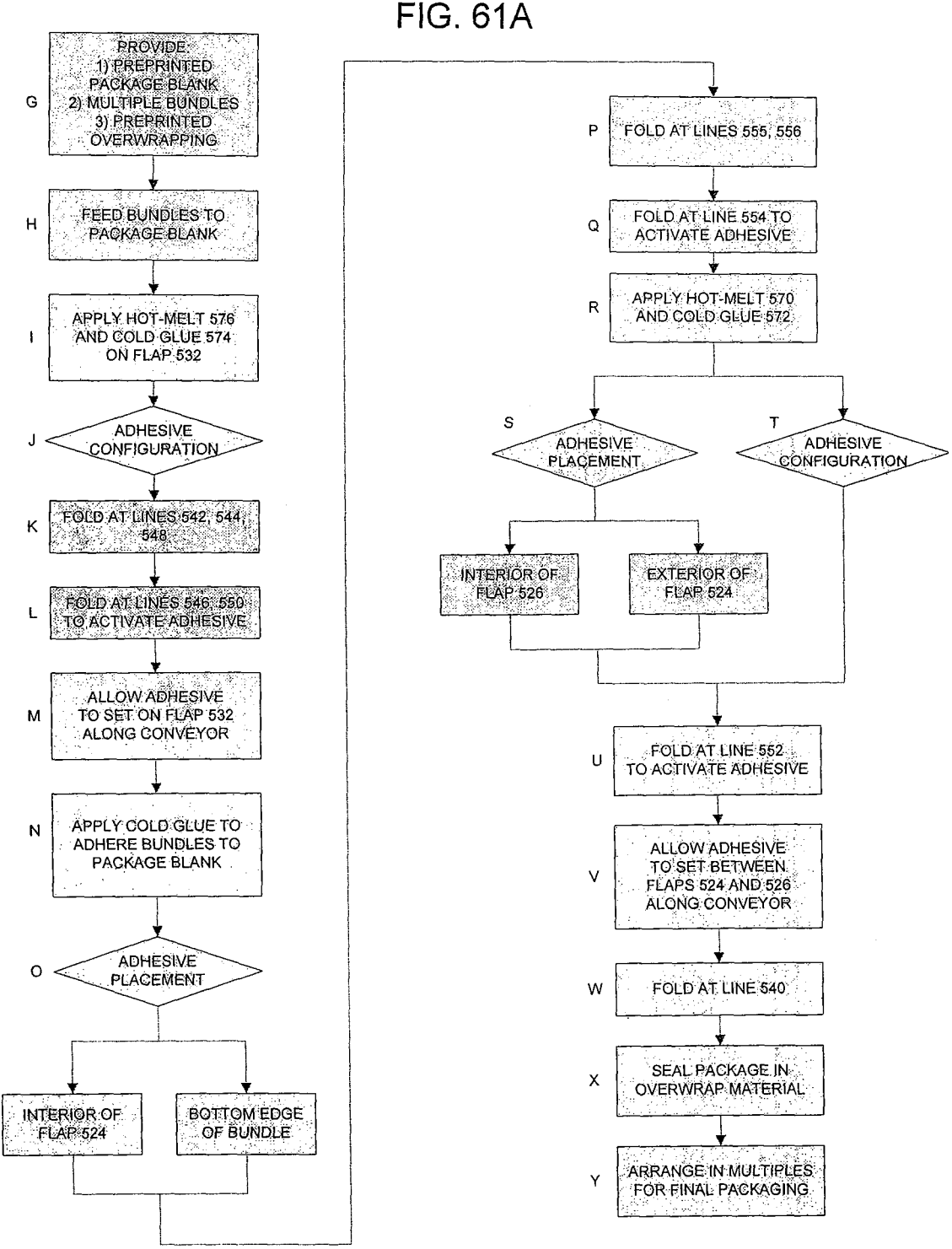
FIG. 61a is a flow chart showing the steps for forming a package from a package of FIG. 54 into a package of FIG. 59.

FIG. 61*a* is a flow chart showing methods of providing a comestible product package. The package blank 510 may be assembled such that it is formed and wrapped around the comestible product bundles 601 so as to ensure a snug fit between the comestible product bundles 601 and the package 510. A preprinted package blank 510, a preprinted overwrap material, and multiple bundles 601 may be provided (step G). A plurality of bundles 601 as described in FIG. 60 may be fed to a single package blank (step H). Next, an adhesive configuration as described above may be applied to the side flap 532 (steps I and J). The package blank may be folded along fold lines 542, 544 and 548 (step K) to envelop the bundles 601. Then, the package blank may be folded along fold lines 546 and 550 so the adhesive can attach the front wall 512 to the side flap 532 (step L). The adhesive on the side flap 532 may be allowed to dry as the bundles are held inside the package interior (step M). Using these methods, the package blank can be pulled taught around the bundles and adhered in such a manner to ensure that the bundles fit snugly within the package. The methods may also prevent the bundles 601 from laterally moving or rattling within the package.

Turning once again to the methods of FIG. 61*a*, a cold-type glue may be applied to adhere the bundles to the interior of the package blank 510 (step N). The adhesive may be placed in different locations (step O). For example, in one embodiment, the cold glue can be applied to the interior of the flap 524. In another embodiment, the cold glue may be applied to the bottom edge 606 of the bundle. Then the package 510 may be folded along fold lines 555 and 556 (step P). The package blank 510 may also be folded along line 554 to activate the adhesive with pressure (step Q). As with the side flap 532, an adhesive configuration may be used to join the bottom flaps 524, 526 (steps R and T). The parallel strip pattern discussed above may be used for this step since these flaps 524, 526 must withstand the weight of the bundles 601. The adhesive may either be placed on the interior of the flap 526 or the exterior of another flap 524 (step S). The package blank may then be folded along a fold line 552 to glue the two bottom flaps together (step U). Lastly, the package blank may be folded along a line 540 so that the movable flap 514 encloses the package interior (step W).

It should be understood that flaps 524 and 526 may be folded in reverse order. For example, adhesive may be placed on the exterior of the flap 526 and/or the interior of the flap 524 to join the two flaps together. Additionally, cold glue can be applied to the interior of the flap 526 to adhere the bundles to the package.

Figure 61B:
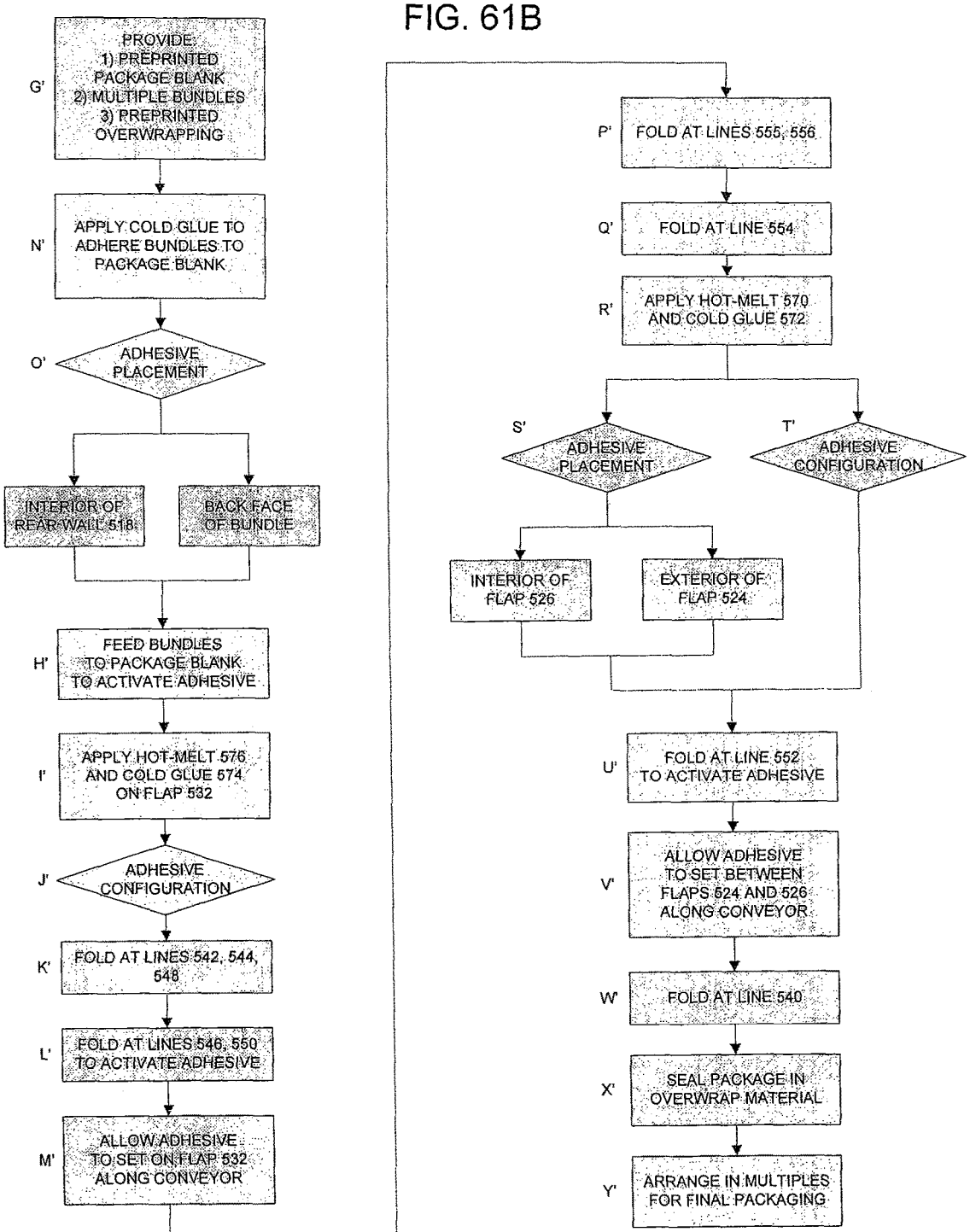

FIG. 61*b* is a flow chart including similar methods as those shown in FIG. 61*a*. FIG. 61*b* similarly shows that the package blank 510 may be assembled such that it is formed and wrapped around the bundles 601, but FIG. 61*b* shows that the bundles 601 are adhered to the package blank 510 in a different manner. Unlike FIG. 61*a*, cold glue is applied to adhere the bundles to the package blank (step N') before the bundles are fed to the package blank (step H'). Furthermore, in FIG. 61*b*, the cold glue is either applied to the interior of rear wall 518 or to the back face 603 of the bundle 601 (step O'). Therefore, FIG. 61*a* shows a step where the bundles 601 are adhered to the package blank 510 along a bottom edge 606 of the bundle (step O), whereas FIG. 61*b* shows a method where the bundles 601 are adhered to the package blank 510 along a back face 603 of the bundle 601 (step O').

FIG. 61*c* is a flow chart showing further methods of providing a comestible product package. In an embodiment, the package 510 may be pre-assembled and pre-formed before the bundles are placed within the package interior (see steps GG to VV). In other words, the package blank 510 may not be formed around the bundles 601, but rather, the bundles 601 may be fitted inside an assembled package. The side flap 532 may be adhered to the front wall 512 to enclose an empty package interior (steps II to MM). Then, the bottom walls 524, 526 of the package 510 may be glued shut (steps PP to VV). Next, adhesive may be applied to adhere the bundles to the interior of the pre-assembled package 510 (step NN). The adhesive may be applied in different areas (step OO). For example, in one embodiment, cold-type glue may be applied to the exterior of the bundle wrapper (e.g. a bottom edge 606 of the bundle or a back face 603 of the bundle). In another embodiment, cold-type glue may be applied to the interior of the bottom flap 524. In yet another embodiment, cold-type glue may be applied to the interior of the rear wall 518. The bundles may be placed in the pre-assembled package 510 to set the adhesive between the package 510 and the bundles (step HH). Finally, to enclose the package interior, the package 510 may be folded along lines 540 and 542 (step WW).

Figure 59:
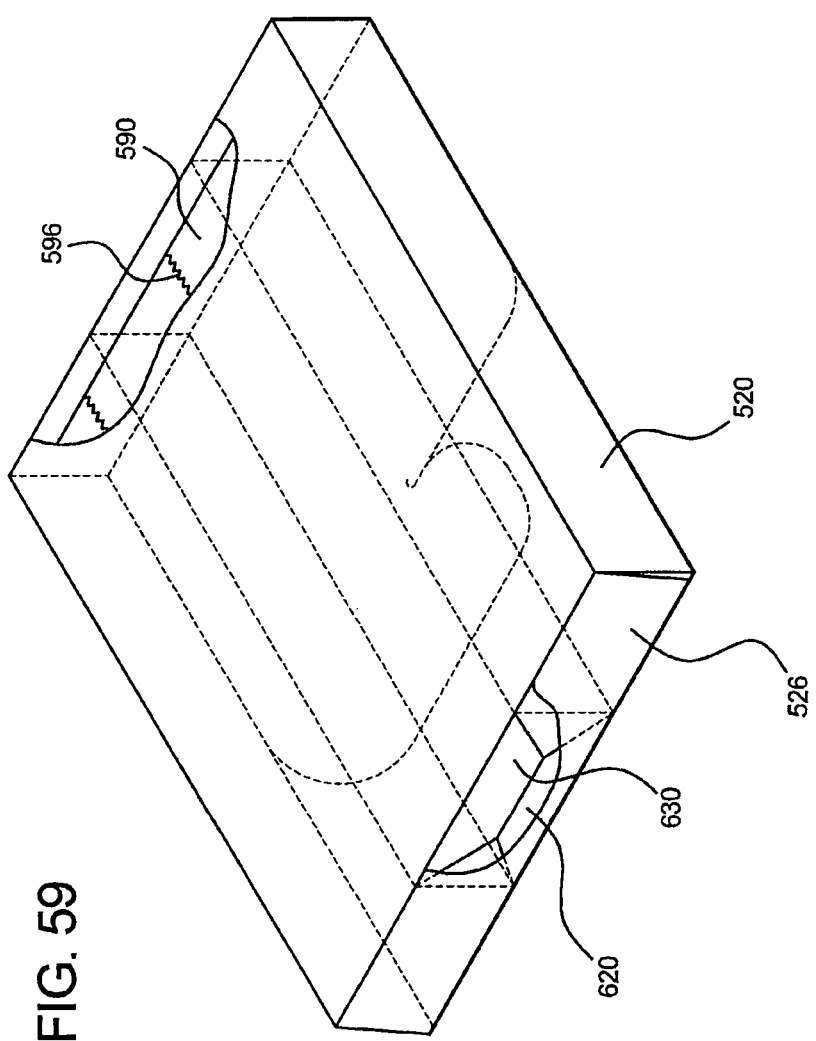
FIG. 59 is a perspective view of the back of the package of FIG. 55 in a closed position with overwrap material.

FIG. 59 shows a comestible product package in a closed position and housing a plurality of comestible products 590. The package may be sealed with an overwrap material to preserve freshness (steps X, X' and XX). The package may be overwrapped using known techniques in the art. The overwrap material may be made from a thin plastic film. The overwrap material can be printed with advertising and/or product information. In an embodiment, the overwrap material may be clear plastic, permitting the consumer to view any writing or indicia provided on the outside of the package 510. Note that it may not be necessary to secure the protruding member 580 in the locking area 560 because the overwrap material may hold the protruding member 580 against the front wall 512 until the consumer removes the overwrap material. In another embodiment, the protruding member 580 may be secured within the locking area 560 before the package is overwrapped. In a further embodiment, the overwrap material may be folded around the package and glued at each end.

A plurality of overwrapped packages may be collated for final packaging (steps Y, Y' and YY). During this step, multiple comestible product packages can be packaged together as a multi-unit pack. For example, a consumer can purchase a sealed bag containing three overwrapped comestible product packages. In addition, a consumer can purchase a sealed box of ten overwrapped comestible product packages.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method of packaging comestible products, the method comprising:
   providing a package blank and a plurality of individually wrapped comestible products;
   arranging the plurality of comestible products in at least three stacks, each of the stacks being at least one comestible product wide and at least two comestible products deep;
   applying adhesive to at least one of a sheet and the three stacks;
   folding the sheet around each of the three stacks to adhesively close an end of the sheet and to releasably attach the plurality of comestible products to the sheet at the same time to form each of the three wrapped stacks; and
   attaching at least one of the wrapped stacks to an interior of the package blank with an adhesive between the sheet and the interior of the package blank, wherein the individually wrapped comestible products arranged in the stack are not adhesively attached to the package blank.

2. The method of claim 1 further comprising folding the sheet and leaving at least a portion of the stack exposed.

3. The method of claim 1 further comprising the step of folding the package blank to form an assembled package blank before the step of attaching the wrapped stack to an interior of the package blank.

4. The method of claim 1 further comprising the step of folding the package blank around the wrapped stack to form a package after the step of attaching the wrapped stack to an interior of the package blank.

* * * * *